US012770083B2

(12) United States Patent
Raj et al.

(10) Patent No.: US 12,770,083 B2
(45) Date of Patent: Oct. 20, 2026

(54) MACHINE LEARNING POWERED USER AND ENTITY BEHAVIOR ANALYSIS

(71) Applicant: Zoho Corporation Private Limited, Chengalpattu Taluk (IN)

(72) Inventors: Malini Christina Raj, Chennai (IN); Ramprakash Ramamoorthy, Maraimalai Nagar (IN); Shailesh Kumar Davey, Potheri (IN)

(73) Assignee: Zoho Corporation Private Limited, Chengalpattu Taluk (IN)

( * ) Notice: Subject to any disclaimer, the term of this patent is extended or adjusted under 35 U.S.C. 154(b) by 460 days.

(21) Appl. No.: 17/351,916

(22) Filed: Jun. 18, 2021

(65) Prior Publication Data

US 2021/0397903 A1 Dec. 23, 2021

Related U.S. Application Data

(60) Provisional application No. 63/120,165, filed on Dec. 1, 2020, provisional application No. 63/083,057, filed on Sep. 24, 2020.

(30) Foreign Application Priority Data

Jun. 18, 2020 (IN) ............................. 202041025719
Oct. 8, 2020 (IN) ............................. 202041043889

(51) Int. Cl.
*G06Q 10/0635* (2023.01)
*G06F 16/28* (2019.01)
(Continued)

(52) U.S. Cl.
CPC ....... *G06Q 10/0635* (2013.01); *G06F 16/285* (2019.01); *G06F 18/2148* (2023.01);
(Continued)

(58) Field of Classification Search
CPC ...... G06F 18/2148; G06F 18/23; G06F 18/24; G06F 18/2415; G06F 21/552;
(Continued)

(56) References Cited

U.S. PATENT DOCUMENTS 9,166,993 B1 * 10/2015 Liu ..................... H04L 63/1425
10,097,690 B1 * 10/2018 Henry ................. H04M 3/5183
(Continued)

FOREIGN PATENT DOCUMENTS

IN 202041025719 6/2020
WO WO-2020120427 A1 * 6/2020 ........... G06F 21/552

OTHER PUBLICATIONS

M. Ma, S. Zhang, D. Pei, X. Huang and H. Dai, "Robust and Rapid Adaption for Concept Drift in Software System Anomaly Detection," 2018 IEEE 29th International Symposium on Software Reliability Engineering (ISSRE), Memphis, TN, USA, 2018, pp. 13-24, doi: 10.1109/ISSRE.2018.00013. (Year: 2018).*
(Continued)

*Primary Examiner* — Michael Simitoski
(74) *Attorney, Agent, or Firm* — Ahmann Kloke LLP

(57) ABSTRACT

The proposed system tracks user and entity behavior under 3 categories—time, count, and pattern. An event is composed of different fields that describe the event. For example, a log on event could have different fields like username, hostname, log on time, log on type, etc. An event is passed through one or more algorithms, depending on what kind of behavioral information needs to be tracked from the event. For example, a user logon event can be processed under the time category to detect whether the user is logging on at an anomalous time. It can also be processed under the pattern category to detect whether the user is logging on a host that does not fit into the user's regular log on pattern. The decision as to which events are to be processed under which
(Continued)

2000 category can be configured external to the system using domain knowledge.

17 Claims, 21 Drawing Sheets

(51) Int. Cl.
*G06F 18/214* (2023.01)
*G06F 18/2415* (2023.01)
*G06F 21/31* (2013.01)
*G06F 21/55* (2013.01)
*G06N 20/00* (2019.01)
*H04L 9/40* (2022.01)
*H04L 67/50* (2022.01)

(52) U.S. Cl.
CPC ........ *G06F 18/2415* (2023.01); *G06F 21/316* (2013.01); *G06F 21/554* (2013.01); *G06N 20/00* (2019.01); *H04L 63/102* (2013.01); *H04L 67/535* (2022.05)

(58) Field of Classification Search
CPC .... G06F 21/554; G06F 21/316; G06F 16/285; G06F 18/285; H04L 63/1425; H04L 63/1416; H04L 63/102; H04L 63/107; H04L 67/535; G06Q 10/0635
See application file for complete search history.

(56) References Cited

U.S. PATENT DOCUMENTS 10,749,883 B1 * 8/2020 Martin .................. G06F 21/554
10,754,936 B1 * 8/2020 Hawes .................. G06F 21/316
10,881,964 B1 * 1/2021 Dills .................... G06F 18/2413
11,431,741 B1 * 8/2022 Lin ..................... H04L 63/1425
11,637,844 B2 * 4/2023 Shenoy ................. H04W 12/67
726/23
2005/0289071 A1 * 12/2005 Goin ..................... G06F 11/008
705/56
2007/0220595 A1 * 9/2007 M'raihi ............... H04L 63/1416
726/5
2011/0296003 A1 * 12/2011 McCann ................. G06F 21/55
709/224
2014/0279745 A1 * 9/2014 Esponda ................ G06N 5/043
706/12
2016/0198316 A1 * 7/2016 Lakshmi Narayanan ..................
H04L 69/40
370/312
2016/0226901 A1 * 8/2016 Baikalov ............. H04L 63/1425
2016/0261622 A1 * 9/2016 Danielson ........... H04L 67/1095
2016/0342903 A1 * 11/2016 Shumpert ............. G06F 11/008
2016/0359740 A1 * 12/2016 Parandehgheibi .. H04L 43/0888
2017/0010930 A1 * 1/2017 Dutta .................. G06F 11/3476
2017/0063912 A1 * 3/2017 Muddu ................ G06V 10/225
2017/0111381 A1 * 4/2017 Jones .................... G06F 21/554
2017/0310691 A1 * 10/2017 Vasseur ............... H04L 41/0631
2018/0027006 A1 * 1/2018 Zimmermann ..... G06F 21/6218
726/11
2018/0077192 A1 * 3/2018 Tan ......................... H04L 63/08
2018/0219888 A1 * 8/2018 Apostolopoulos ...........................
H04L 63/1425
2018/0248895 A1 * 8/2018 Watson ................. H04L 63/083
2018/0278634 A1 * 9/2018 Adir ...................... G06F 21/577
2018/0288063 A1 * 10/2018 Koottayi ................. G06F 21/50
2018/0332064 A1 * 11/2018 Harris ..................... G06F 15/16
2018/0357422 A1 * 12/2018 Telang .................. G06F 21/577
2018/0359270 A1 * 12/2018 Chari .................... H04L 63/102
2018/0375886 A1 * 12/2018 Kirti ................... H04L 63/1433
2019/0068627 A1 * 2/2019 Thampy .............. H04L 63/1425
2019/0095608 A1 * 3/2019 Kohli ................... G06Q 20/405
2019/0114404 A1 * 4/2019 Nowak ................. H04W 12/06
2019/0220863 A1 * 7/2019 Novick .................. G06Q 20/10
2019/0260742 A1 * 8/2019 Arora ........................ G06N 3/08
2019/0260777 A1 * 8/2019 Mehrotra ................ H04L 63/08
2019/0260795 A1 * 8/2019 Araiza ..................... H04L 51/42
2019/0303771 A1 * 10/2019 Soong .................... G06Q 50/01
2019/0324068 A1 * 10/2019 Natsumeda .......... G01R 21/133
2020/0007563 A1 * 1/2020 Leibman ............. H04L 41/0893
2020/0053110 A1 * 2/2020 Wan ...................... H04L 67/535
2020/0084219 A1 * 3/2020 Sung ..................... H04L 63/102
2020/0089887 A1 * 3/2020 Luthra .................. G06F 21/577
2020/0128047 A1 * 4/2020 Biswas ................... H04L 67/10
2020/0175421 A1 * 6/2020 Zhou ................... G06F 18/2451
2020/0184487 A1 * 6/2020 Pandya ............... H04L 63/1441
2020/0186544 A1 * 6/2020 Dichiu ................ H04L 63/1433
2020/0210393 A1 * 7/2020 Beaver ..................... G06F 17/18
2020/0228538 A1 * 7/2020 Soule .................... H04L 63/105
2020/0252418 A1 * 8/2020 Atighetchi .............. H04L 63/20
2020/0267171 A1 * 8/2020 Mozumdar .............. G06N 7/01
2020/0322368 A1 * 10/2020 Cohen ..................... G06F 18/23
2020/0334498 A1 * 10/2020 Pan ........................ G06N 5/025
2020/0366699 A1 * 11/2020 Sampaio ........... G06F 16/24568
2021/0049418 A1 * 2/2021 Zhao ...................... G06N 3/047
2021/0090816 A1 * 3/2021 Ibrahim ................. G06N 20/00
2021/0117977 A1 * 4/2021 Kim ...................... G06F 18/214
2021/0142209 A1 * 5/2021 Patil ........................ H04L 63/20
2021/0240588 A1 * 8/2021 Balthazar de Lima Mussauer .....
G06F 21/316
2021/0306354 A1 * 9/2021 Raghuramu ........... G06N 20/00
2021/0360059 A1 * 11/2021 Savalle ................... H04L 43/08
2022/0327186 A1 * 10/2022 Tomoda ................ G06F 21/316
2023/0171277 A1 * 6/2023 Giaconi .............. H04L 63/1425
726/23

OTHER PUBLICATIONS

Aggarwal, Charu C., and Philip S. Yu. "On clustering massive text and categorical data streams." Knowledge and information systems 24 (2010): 171-196. (Year: 2010).*

Xiao-Dong Zang, J. Gong and Xiao-Yan Hu, "An Adaptive Profile-Based Approach for Detecting Anomalous Traffic in Backbone," in IEEE Access, vol. 7, pp. 56920-56934, 2019, doi: 10.1109/ACCESS.2019.2914303. (Year: 2019).*

Tu, Q., et al. "Density-based hierarchical clustering for streaming data." Pattern Recognition Letters 33.5 (2012): 641-645. (Year: 2012).*

Y. Zhou, Y. Wang and X. Ma, "A User Behavior Anomaly Detection Approach Based on Sequence Mining over Data Streams," 2016 17th International Conference on Parallel and Distributed Computing, Applications and Technologies (PDCAT), Guangzhou, China, 2016, pp. 376-381. (Year: 2016).*

S. Hu, Z. Xiao, Q. Rao and R. Liao, "An anomaly detection model of user behavior based on similarity clustering," 2018 IEEE 4th Information Technology and Mechatronics Engineering Conference (ITOEC), Chongqing, China, 2018, pp. 835-838. (Year: 2018).*

Guha, Sudipto, Rajeev Rastogi, and Kyuseok Shim. "ROCK: A robust clustering algorithm for categorical attributes." Information systems 25.5 (2000): 345-366. (Year: 2000).*

F. Ansarifar and A. Ahmadi, "A Novel Algorithm for Adaptive Data Stream Clustering," Electrical Engineering (ICEE), Iranian Conference on, Mashhad, Iran, 2018, pp. 1542-1546, doi: 10.1109/ICEE.2018.8472649. (Year: 2018).*

M. Jayswal and M. Shukla, "Consolidated study & analysis of different clustering techniques for data streams," 2016 3rd International Conference on Computing for Sustainable Global Development (INDIACom), New Delhi, India, 2016, pp. 3541-3547. (Year: 2016).*

* cited by examiner

1000

1300

MACHINE LEARNING POWERED USER AND ENTITY BEHAVIOR ANALYSIS

CROSS-REFERENCE TO RELATED APPLICATIONS

The present application claims priority to Indian Provisional Patent Application No. 202041025719 filed Jun. 18, 2020, Indian Provisional Patent Application No. 202041043889 filed Oct. 8, 2020, U.S. Provisional Patent Application Ser. No. 63/083,057 filed Sep. 24, 2020, and U.S. Provisional Patent Application Ser. No. 63/120,165 filed Dec. 1, 2020, which are incorporated by reference herein.

BACKGROUND

User behavior analytics is the tracking, collecting, and assessing of user data and activities using monitoring systems. It reflects that users are just one category of entities with observable behaviors on modern networks. Other entities can include processes, applications, and network devices.

DETAILED DESCRIPTION

A User and Entity Behavior Analysis (UEBA) system helps build a behavioral profile of users and entities in an organization and assigns a risk score when the behavior of a user or entity deviates from the normal. This intrusion detection system helps identify compromised accounts, data exfiltration, and insider threats and can serve both as a diagnostic tool and an early warning system. In a specific implementation, identification of anomalies under three categories (time, pattern, and count) is accomplished using unsupervised ML techniques (RPCA, Markov chains, and EMA) and alert fatigue reduction through peer grouping. These unsupervised techniques require no labelled information and can constantly adapt to changing patterns in the data, thereby reducing false positives, and eliminating the need for re-training.

User and Entity Behavior Analysis can be a key component of a cyber security framework that seeks to detect insider threats. UEBA systems track users and entities in an enterprise or organization and build up a profile of their normal behavior. These systems then raise alerts when the behavior of the user or entity deviates from the previously established normal baseline.

A proposed system tracks user and entity behavior under 3 categories—time, count, and pattern. An event is composed of different fields that describe it. For example, a log on event could have different fields like username, hostname, log on time, log on type, etc. An event is passed through one or more algorithms, depending on what kind of behavioral information needs to be tracked from the event. The decision of which inputs to feed to which algorithms, and the handling of the anomalous events detected, are done external to the system. This allows the engine to be highly flexible and generalize to multiple domains, without changes to the engine itself.

Figure 1:
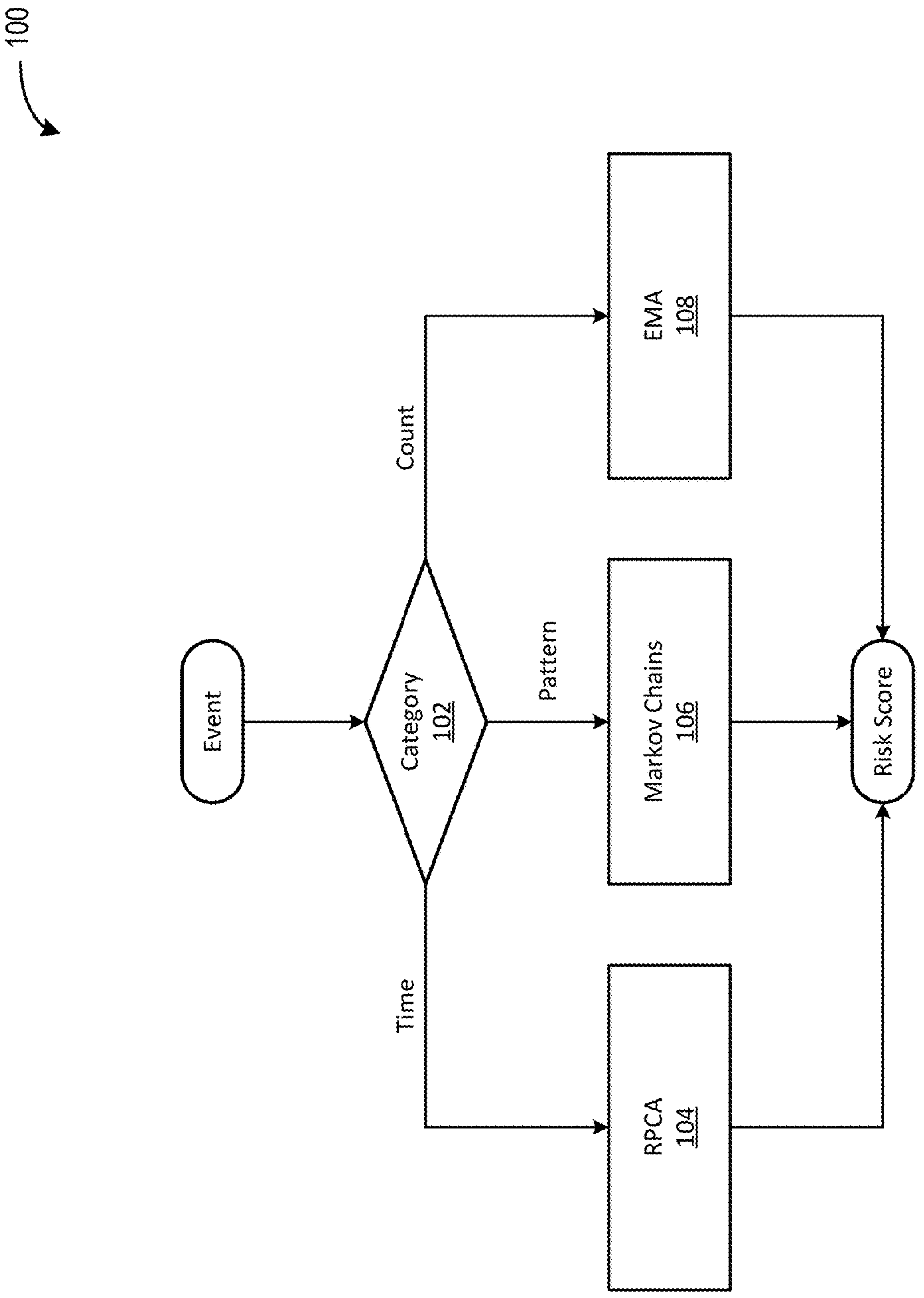
FIG. 1 is a flowchart of an example of risk score generation from an event.

FIG. 1 is a flowchart 100 of an example of risk score generation from an event. The flowchart 100 starts at decision point 102 with determining a category for an event. In a specific implementation, the decision as to which events are to be processed under which category is configured external to the system using domain knowledge. In a specific implementation, the system requires minimum 2 weeks of historical data to learn behavioral patterns, though a longer timespan can result in better performance. Data collected from different sources including firewalls, routers, workstations, databases, and file servers are used for analysis. If the event is categorized by time (102-Time), then the flowchart 100 continues to module 104 where Robust Principal Component Analysis (RPCA) is used. If the event is categorized by pattern (102-Pattern), then the flowchart 100 continues to module 106 where Markov Chains are used. If the event is categorized by count (102-Count), then the flowchart 100 continues to module 108 where Exponential Moving Average (EMA) is used. In a specific implementation, the algorithms used are unsupervised and adapt to changing data patterns. Also, algorithm-specific hyper-parameters have already been tuned, thus making configuration simpler. Regardless of the chosen algorithm, the flowchart 100 ends with the determination of a risk score. The risk score can be used, for example, to identify malicious or compromised users/entities.

For example, a user logon event can be processed under the Time category to detect whether the user is logging on at an anomalous time. It can also be processed under the Pattern category to detect whether the user is logging on a host that does not fit into the user's regular logon pattern.

Types of Anomalies

Time Anomalies

In the time category, the time at which a user does a particular activity, such as log ons, file downloads, file uploads, etc. is modeled. Cases such as machine log ons or printing requests at unusual times, could be indicative of a compromised user account and are flagged here. The algorithm used for identifying anomalies in this category is called Robust Principal Component Analysis (RPCA). This algorithm also provides an expected value for each anomaly. The difference between the expected time of occurrence of the specific event and the actual time of occurrence can help in gauging the severity of the anomaly and provide a risk score. For example, an employee logs on at 5 am when he generally logs on between 9 and 10 am would be flagged as an anomaly.

Figure 2:
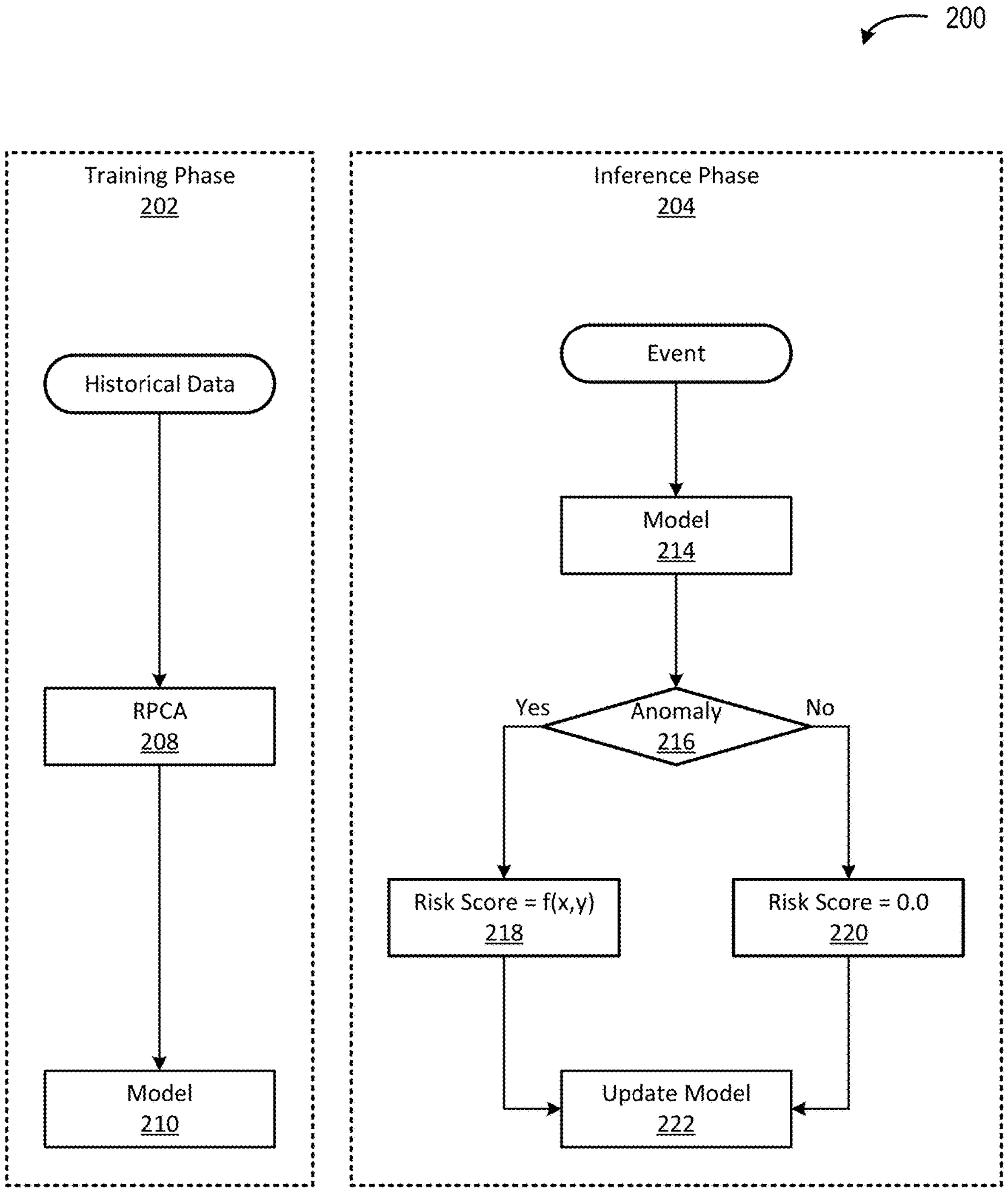
FIG. 2 is a diagram of an example of risk score provisioning using a difference between an expected time of occurrence of an event and an actual time of occurrence.

FIG. 2 is a diagram 200 of an example of risk score provisioning using a difference between an expected time of occurrence of an event and an actual time of occurrence. The diagram 200 includes a training phase 202 and an inference phase 204. The training phase 202 starts with providing historical data for RPCA at module 208 and ends with generating a model at module 210. In a specific implementation, the model is a list containing historical data (e.g., historical data points).

The inference phase 204 starts with modeling an event at module 214. Adding anomalies to the model helps capture concept drift if it occurs and adapt accordingly, during which anomalies eventually become normal. For example, Model' includes a first anomaly. Model" includes multiple anomalies. Having multiple anomalies over an extended period indicates that the data distribution has changed over time and concept drift has occurred. This means detected anomalies become a new normal. Eventually Model" becomes the Model, and this new Model will consider all the anomalies that were previously detected in Model' and Model" as normal. It may be noted, however, that in a specific implementation, there is actually only one model; Model' is conceptual.

The flowchart 200 continues to decision point 216 with determining whether the event has an anomaly. If it is determined the event has an anomaly (216-Yes), then the flowchart 200 continues to module 218 with determining a risk score that is equal to a function of x and y. For example, the risk score could be equal to the absolute value of $(x-y)/x$, where x is an expected value and y is an actual value. If it is determined the event does not have an anomaly (216-No), then the flowchart 200 continues to module 220 with setting a risk score equal to 0 (or a zero-equivalent value). In either case, the flowchart 200 ends with updating the model at module 222.

Count Anomalies

A high number of file downloads, failed logons, printing requests, etc. by a user could be indicative of either a compromised account or an infiltration attempt by external hackers. In a specific implementation, these kinds of anomalies are detected by maintaining an Exponential Moving Average (EMA) for an aggregation interval specified in minutes. For example, if the interval is configured to be 60 minutes, then events are aggregated every 60 minutes and 24 different averages are maintained, one for each hour of the day. Thresholds are then calculated for each hour as, for example, the (average+n*[exponential moving standard deviation]), where n is a configurable parameter. If the number of events per hour exceeds the associated threshold, an anomaly is flagged. Daily and monthly EMAs are also maintained with respective thresholds. Thus, an event could be an interval, daily, or monthly anomaly, or be an anomaly under more than one category. Based on the difference between the actual count of events, and the threshold, a risk score is generated. For example, if a user has executed 20 DML, queries on an SQL server when the threshold is only 3, an anomaly is detected with a risk score of 1.

Figure 3:
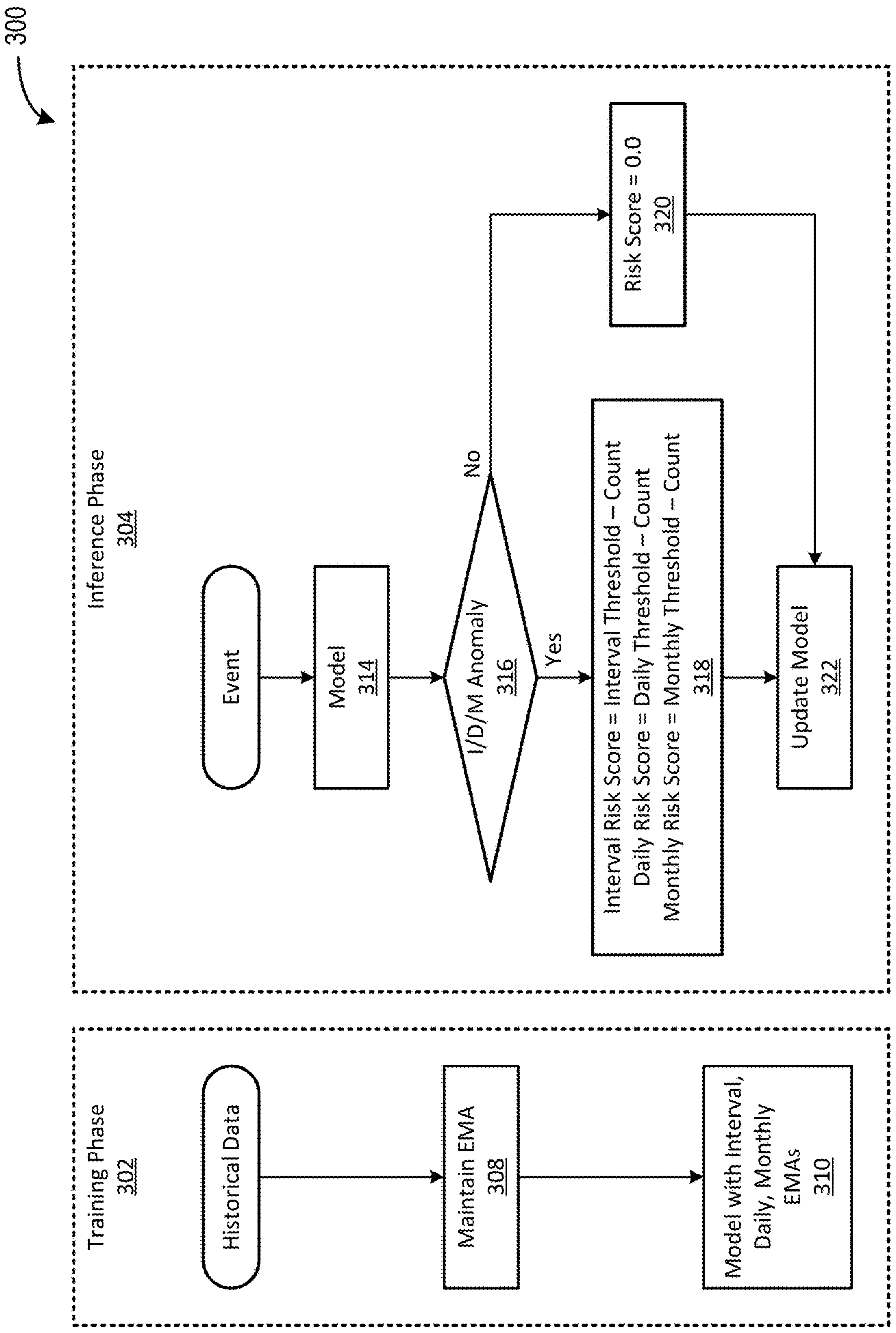
FIG. 3 is a diagram of an example of risk score provisioning using a difference between a threshold and an actual count of occurrence.

FIG. 3 is a diagram 300 of an example of risk score provisioning using a difference between a threshold and an actual count of occurrence. The diagram 300 includes a training phase 302 and an inference phase 304. The training phase 302 starts with providing historical data for maintenance of an EMA at module 308 and ends with generating a model with interval, daily, and monthly EMAs at module 310. In an alternative, there are more than three of interval, daily, and monthly EMAs. In another alternative, there are fewer.

The inference phase 304 starts with modeling an event at module 314. The flowchart 300 continues to decision point 316 with determining whether the event has an interval, daily, or monthly anomaly. If it is determined the event has an anomaly (316-Yes), then the flowchart 300 continues to module 318 with determining a risk score that is equal to the difference between a threshold and actual count. For example, the risk score could be equal to ([interval threshold]−count) for an interval risk score, ([daily threshold]−count) for a daily risk score, and ([monthly threshold]−count) for a monthly risk score. If it is determined the event does not have an anomaly (316-No), then the flowchart 300 continues to module 320 with setting a risk score equal to 0 (or a zero-equivalent value). In either case, the flowchart 300 ends with updating the model at module 322.

Pattern Anomalies

Figure 4:
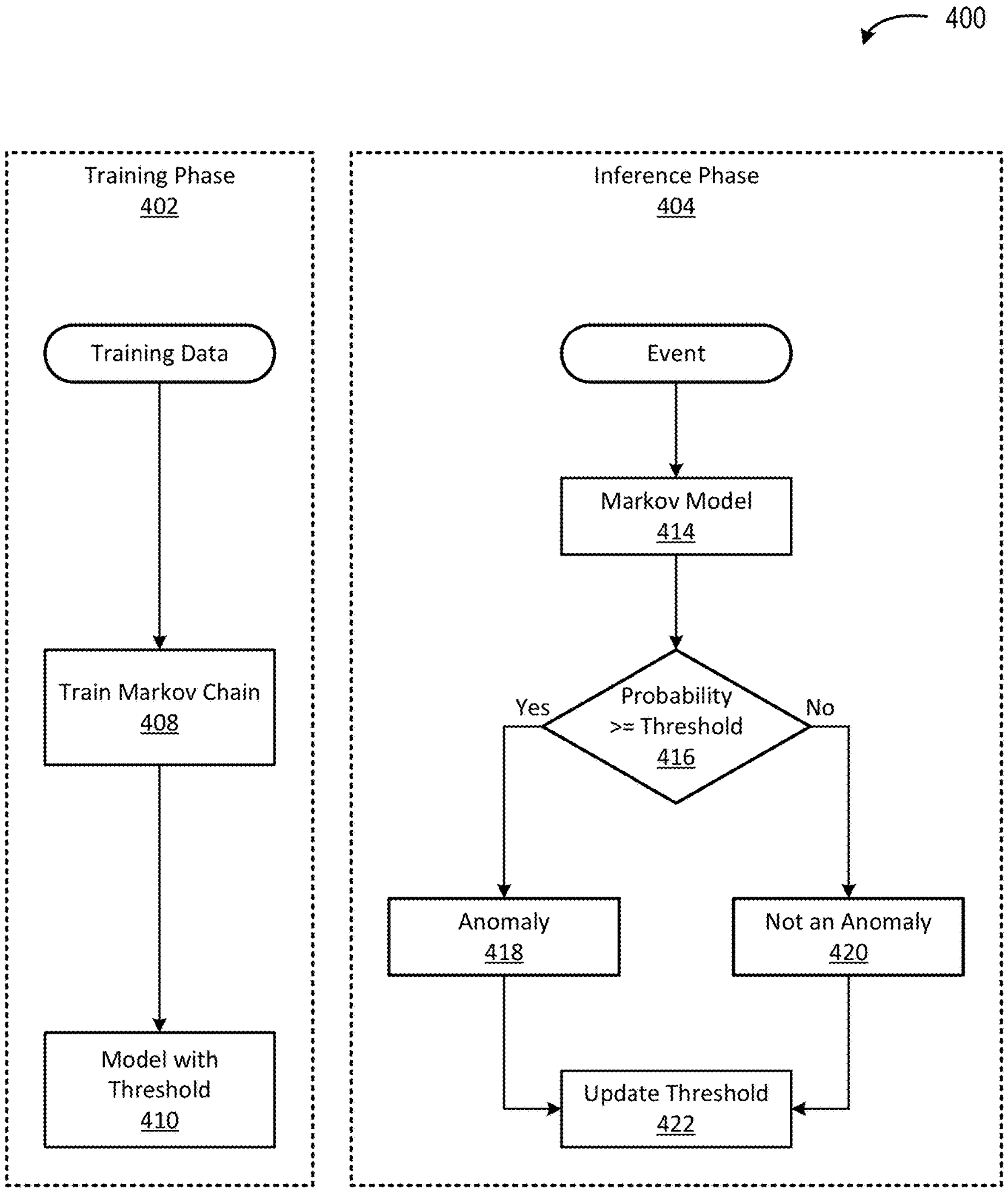
FIG. 4 is a diagram of an example of risk score provisioning using event probability.

Anomalies that can be captured based on other behavior patterns besides the time and the count of different events, come under the pattern category. For example, we may wish to capture cases Where a user logs on to a machine that he has not used before, in a remote session. To detect this case, we can form a pattern using the fields USERNAME, HOSTNAME, LOGON TYPE, The patterns to be monitored are configured initially, and a Markov Chain model is trained with available data. (In the given example, the data could include available logon records with users, hosts, and logon type information.) The model is used to determine the probabilities of different events occurring. A threshold is calculated from the training data as shown in FIG. 4, and the model detects anomalies during the inference phase if the probability of the event occurring is lesser than the threshold. The probabilities and threshold of the model is updated with each query, thus ensuring that the model adapts to changing patterns.

FIG. 4 is a diagram 400 of an example of risk score provisioning using event probability. The diagram 400 includes a training phase 402 and an inference phase 404. The training phase 402 starts with providing training data for training a Markov chain at module 408 and ends with generating a model with threshold at module 410.

The inference phase 404 starts with modeling an event at module 414. The flowchart 400 continues to decision point 416 with determining whether probability is greater than or equal to the threshold. If it is determined the probability is less than the threshold (416-No), then the flowchart 400 continues to module 418 with determining a risk score for an anomaly. For example, the risk score could be calculated as (1−[probability of event occurring]). In the case of a user logging on to a machine he has never used before, the probability would be 0, thus it would be detected as an anomaly with a risk score of 1. If it is determined probability is greater than or equal to the threshold (416-Yes), then the flowchart 400 continues to module 420 with determining a risk score for a non-anomaly, such as by setting a risk score equal to 0 (or a zero-equivalent value). In either case, the flowchart 400 ends with updating the threshold at module 422.

Peer Grouping

Anomalies detected during the previous stage are detected based on the individual behavior of users and entities. There may be cases where an event may be anomalous considering the past behavior of a specific user but may not be anomalous considering the normal behavior of his/her peers. In those cases, the risk score generated can be moderated by comparison with the baseline of the peer group to which the user belongs as shown in FIG. 5.

Figure 5:
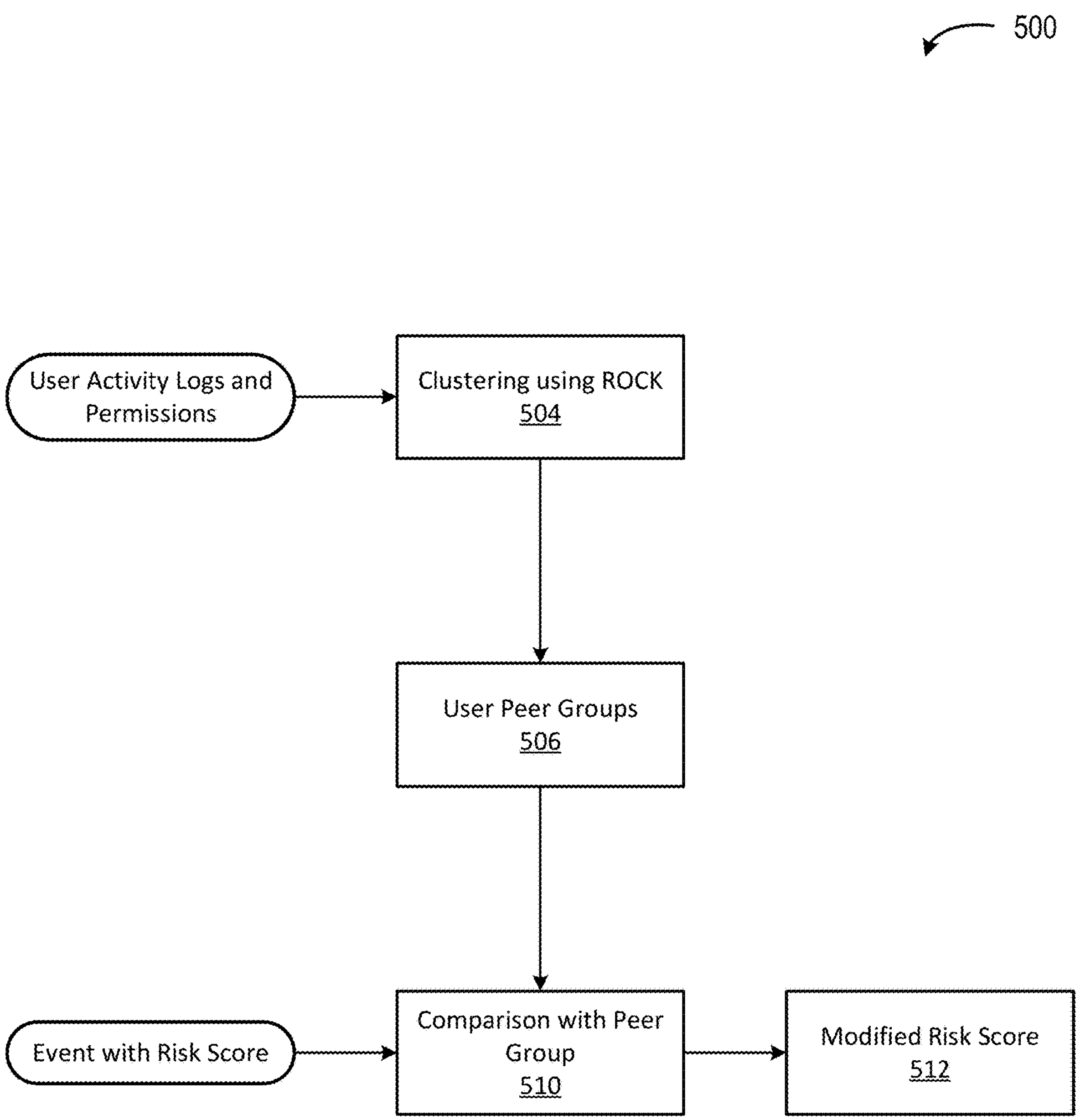
FIG. 5 is a flowchart of a method for determining a modified risk score using ROCK.

FIG. 5 is a flowchart 500 of a method for determining a modified risk score using ROCK. The flowchart 500 starts at module 504 with clustering user activity logs and permissions using a machine learning algorithm called ROCK. In a specific implementation, the input to ROCK is records of all pertinent information of all the users in the organization. Pertinent information includes log on times, devices accessed, access permissions, etc. and they form the fields upon which clustering takes place. When users are clustered into different peer groups, each group has a list of all acceptable values for each field. At module 506, peer groups are formed by analyzing similarities in the behavior of users.

When an event is flagged as an anomaly, the peer group to which the user associated with the event belongs is found, and the values of the fields in the event are compared with the acceptable values for that peer group at module 510. Depending on how many fields have values that are acceptable, the risk score is raised or lowered at module 512. The modified risk score is then used to assess the threat posed by a user to the organization, in conjunction with all the other risk scores associated with different events initiated by the user.

Overview of the Algorithms Used

Robust Principal Component Analysis (RPCA)

This algorithm decomposes a data matrix into two components—low rank and sparse. The low rank component captures the underlying distribution of the data and can be thought of as representing normal behavior. The sparse component captures outliers or anomalies that do not fit in with the data distribution that is identified. Any non-zero entry in the sparse component indicates an anomaly. The past data points are stored in a model, and when new data points come in, they are appended to the older points and then passed to the algorithm. If the sparse component for the new data point is nonzero, then it is flagged as an anomaly.

Exponential Moving Average (EMA)

In this method, the average of a series of points is calculated by giving exponentially decreasing weights to older points. The formula to calculate the EMA at a point t is:

$$EMA(t) = w * t + (1 - w) * EMA(t - 1)$$

Where,

EMA(t−1)=EMA at the previous data point t=current data point

EMA(t)=EMA at the current data point weight, w=2/(n+1)

n=configurable parameter which determines how many of the latest points should contribute the most to the EMA Markov Chains This algorithm works by forming chains of different states that can occur one after the other, on the principal that the probability of a state B occurring after a state A, depends only on the current state A and not on any other states that occurred before A. This has been adapted to finding anomalies in patterns as follows. Suppose the pattern to be modeled is USERNAME, HOSTNAME, LOGON TYPE. Then the probability of the whole chain is obtained by multiplying the probability of co-occurrence of the USERNAME and HOSTNAME values, and the probability of co-occurrence of the HOSTNAME and LOGON TYPE values.

Robust Clustering Using Links (ROCK)

Figure 6:
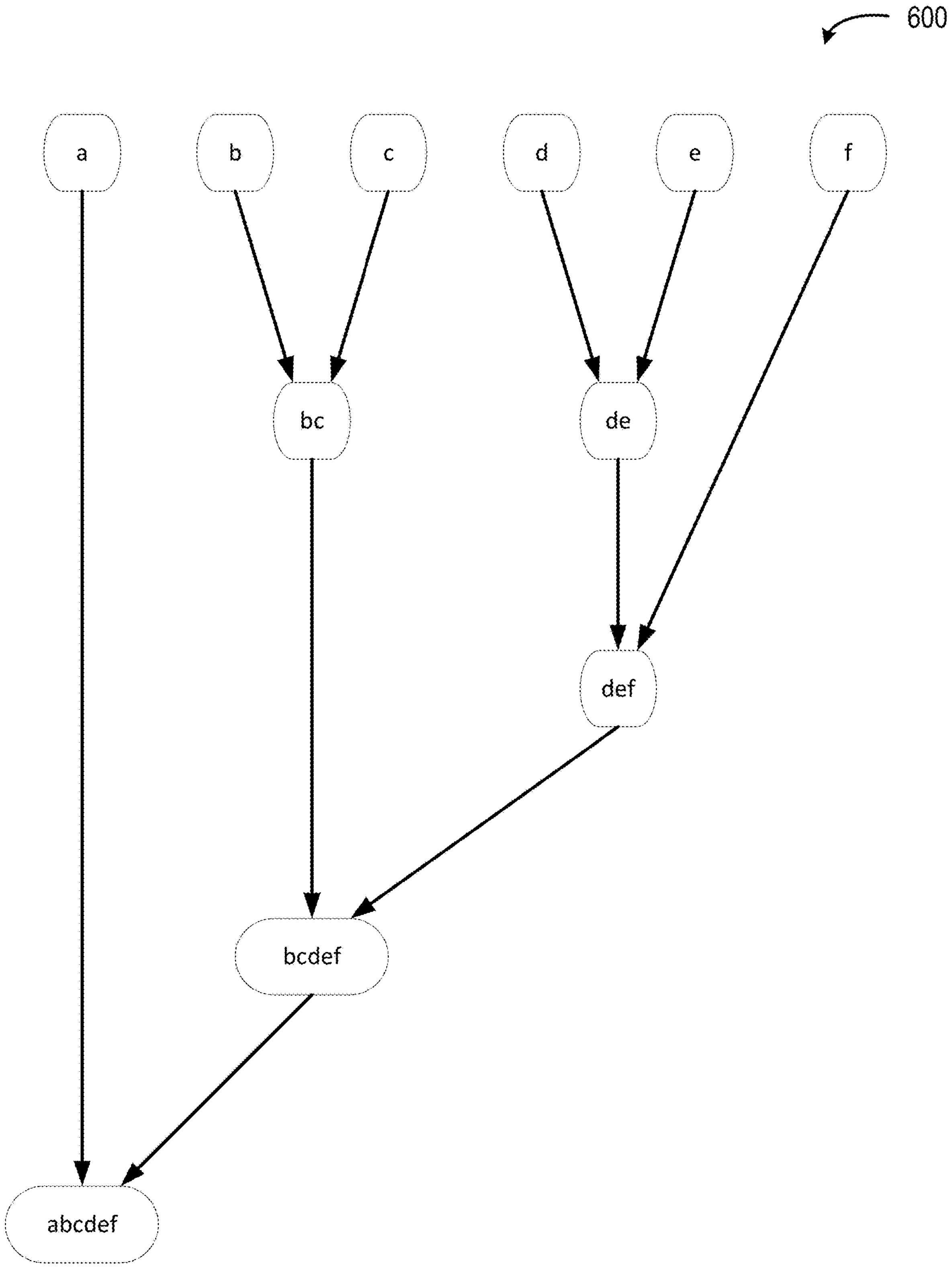
FIG. 6 is a diagram of a tree to illustrate clusters merged in successive levels.

This is an agglomerative hierarchical clustering algorithm that is especially suitable for clustering based on categorical variables. An agglomerative clustering algorithm follows the bottom-up approach, where each data point is considered a cluster initially, and clusters are merged in successive levels as shown by way of example in the tree structure 600 of FIG. 6.

ROCK uses a concept of links between data points instead of using traditional distance measures such as Euclidean distance. The algorithm performs better than traditional partitioning clustering methods such as KMeans, KMedoids, CLARA, CLARANS, etc. which are much more effective for numerical datasets. Density based methods such as DBSCAN may flag certain records as noise and users such as superadmins may be singled out as anomalies instead of a valid cluster. Once data is passed to the algorithm for clustering, the similarity between each and every pair of data points is calculated based on the Jaccard Coefficient, and stored. A pair of points are considered to be neighbors if their similarity exceeds a certain threshold. The number of links between a pair of points is the number of common neighbors for the points. The larger the number of links between a pair of points, the greater is the likelihood that they belong to the same cluster. In the first iteration of the algorithm, each point is considered to be a cluster as shown in FIG. 7.

Figure 7:
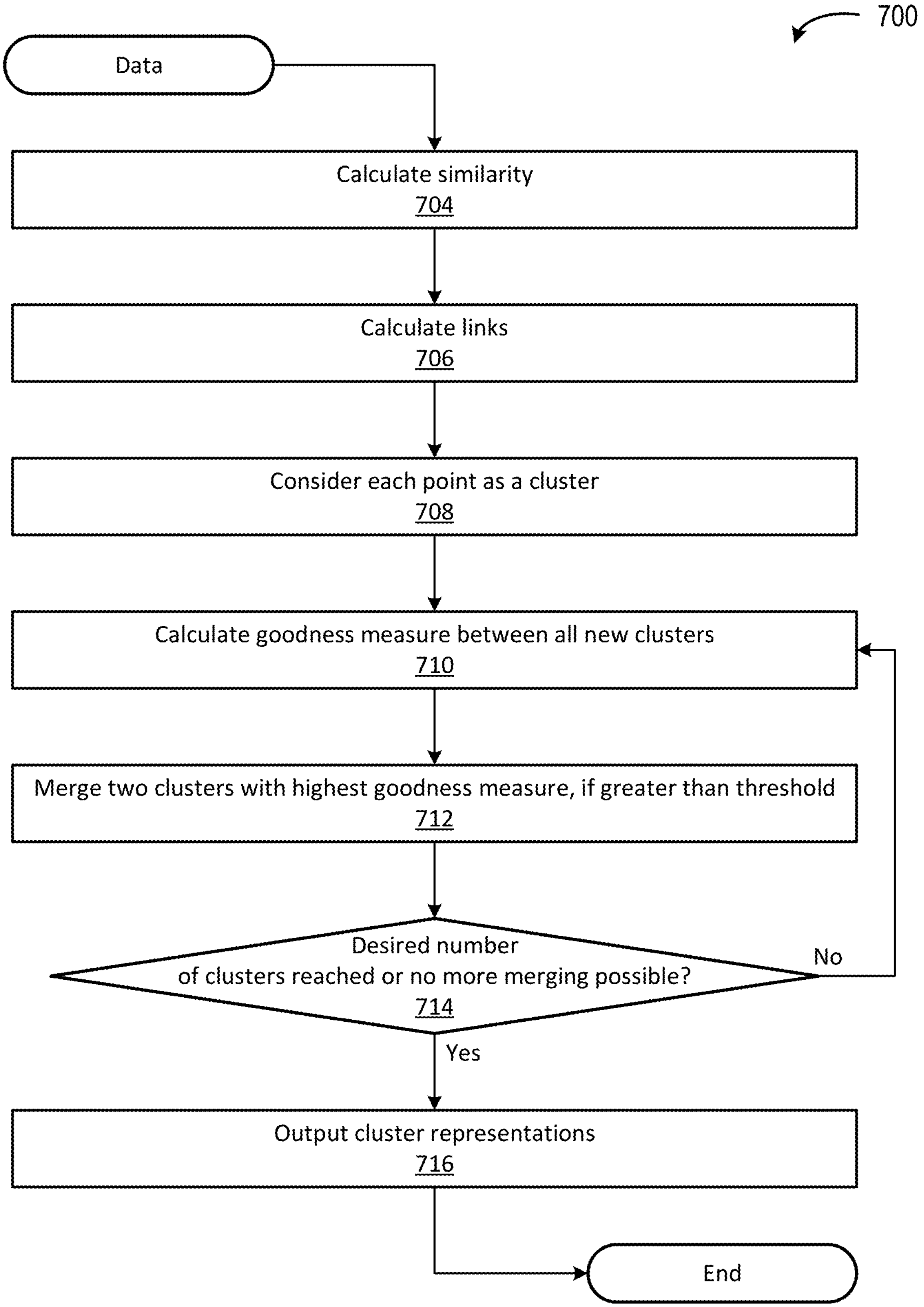
FIG. 7 is a flowchart of an example of a ROCK method for obtaining cluster representations.

FIG. 7 is a flowchart 700 of a ROCK method of obtaining cluster representations. The flowchart 700 starts at module 704 with calculating similarity of data, continues to module 706 with calculating links between data points, and continues to module 708 with considering each point as a cluster. In each consecutive iteration, the clusters are merged depending on the number of cross links between them. This is determined by calculating the goodness measure between each pair of clusters at module 710. In a specific implementation, the goodness measure is the number of cross links between the pair of clusters divided by the expected number of cross links between them. The pair of clusters with the highest goodness measure are the ones that are most suitable for merging at any given iteration. The flowchart 700 continues to module 712 with merging two clusters with highest goodness measure, if greater than threshold. Thus, a pair of clusters can be merged only if the goodness measure exceeds a previously configured threshold. If this threshold is not high enough, the quality of the clusters formed is reduced.

The flowchart 700 continues to decision point 714 with determining whether a desired number of clusters has been reached or no more merging is possible. If not (714-No), then the flowchart returns to module 710 and continues as described previously. Otherwise (714-Yes), the flowchart 700 ends module 716 with outputting cluster representations. Thus, the process is continued until no more clusters can be merged, or if the number of clusters formed goes below a desired number. Once clustering is complete, we can use the representations of the different clusters that are formed as the baseline behavior for different peer groups.

ConStream (CONdensation Based STREAM Clustering)

ConStream adapts to time-varying patterns. E.g., a person who is logging in from one location relocates and the new location becomes the new normal. This enables creation of a new category based on the new normal without separate training; data distribution has changed. Advantageously, algorithms can adapt to concept drift without separate training. An admin may get notification of anomaly, but the system adapts to changes, so the admin will eventually stop getting notifications.

Figure 8:
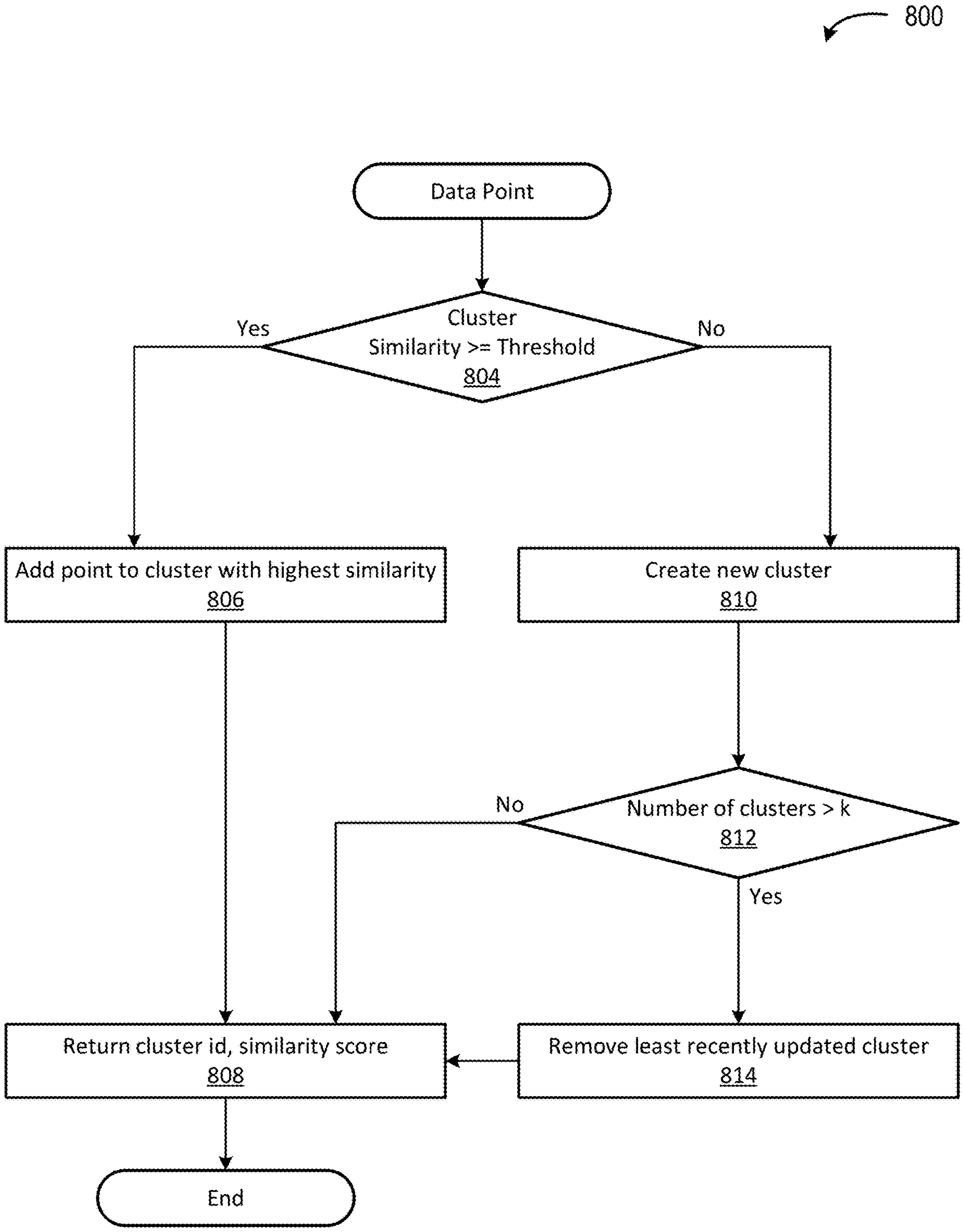
FIG. 8 is a flowchart of an example of a ConStream method for determining a cluster ID and similarity score.

When data is received as a stream it is possible that the data distribution may vary over time i.e., clusters that are currently present in the data at time t may be inactive at time t+1, and there may be new clusters created as the data distribution changes. Although ROCK was suitable for clustering categorical variables, it is not suitable for handling streaming data. When the data distribution changes, thus rendering the learned model obsolete, concept drift is said to have occurred. Concept drift can be handled externally by running the algorithm at regular intervals and comparing the clusters produced. Space and time complexity is also high because it performs multiple passes over the data points. ConStream handles concept drift in the following manner. If an incoming data point at time t, does not fit into any of the existing clusters, a new cluster is created with this point as shown in FIG. 8. Note that this new cluster could represent an outlier or a trend setter.

FIG. 8 is a flowchart 800 of an example of a method for determining a cluster ID and similarity score. The flowchart 800 starts at decision point 804 with determining whether cluster similarity is greater than or equal to a threshold for a data point. If so (804-Yes), then the flowchart 800 continues to module 806 with adding point to cluster with highest similarity and ends at module 808 with returning cluster ID and similarity score. If not (804-No), then the flowchart 800 continues to module 810 with creating a new cluster. If no more points fall into the newly created cluster in the future, then it is an outlier. However, if other points begin to fall into this cluster, it becomes a trend setter, essentially denoting that the trend (distribution) of the data began to change from the point of time this cluster was created. When clusters remain inactive over an extended period, i.e., no points were added in that period, a cluster can be removed from the list of existing clusters; this process is called cluster death. Outliers also undergo cluster death because clusters are defined as outliers only when new points do not fall into that cluster.

From module 810, the flowchart 800 continues to decision point 812 where it is determined whether the number of clusters is greater than k, where k represents a (configurable, actual, or preferred) maximum number of clusters that can be present at any given time. If not (812-No), then the flowchart 800 ends at module 808 as described previously. If so (812-Yes), then the flowchart 800 continues to module 814 where the least recently updated cluster is removed and then ends at module 808 as described previously. The algorithm goes over each point only once, and thus is much faster than the ROCK. It keeps a handle over the memory requirements through a configurable parameter k. If the number of clusters exceeds this value, then the least recently updated cluster is removed. Weighted Jaccard coefficient is used as the similarity measure. While calculating the Jaccard coefficient, the weights provided to each point by the fading function are used to determine a weighted count.

A new cluster could be created from a dramatic difference between an individual and a peer group. Cluster death happens if nobody is in the cluster. Because data distribution could be changed with time, recent points could be given more weight. This can be done, for example, through the form of a fading function $f(t)=2^{-\lambda t}$ which uniformly decays with time t. Here λ is called the decay rate, and the higher the value of λ, the higher the importance given to recent data compared to data points in the past. Thus, for data streams which do not change much, we should pick a lower value of λ, whereas for rapidly changing data streams we should pick a higher value. The maximum inactivity period after which a cluster dies is equal to 1/λ. Thus, if λ is set to be 0.001, a cluster dies if there are no new points added to the cluster in 1000 time steps.

Figure 9:
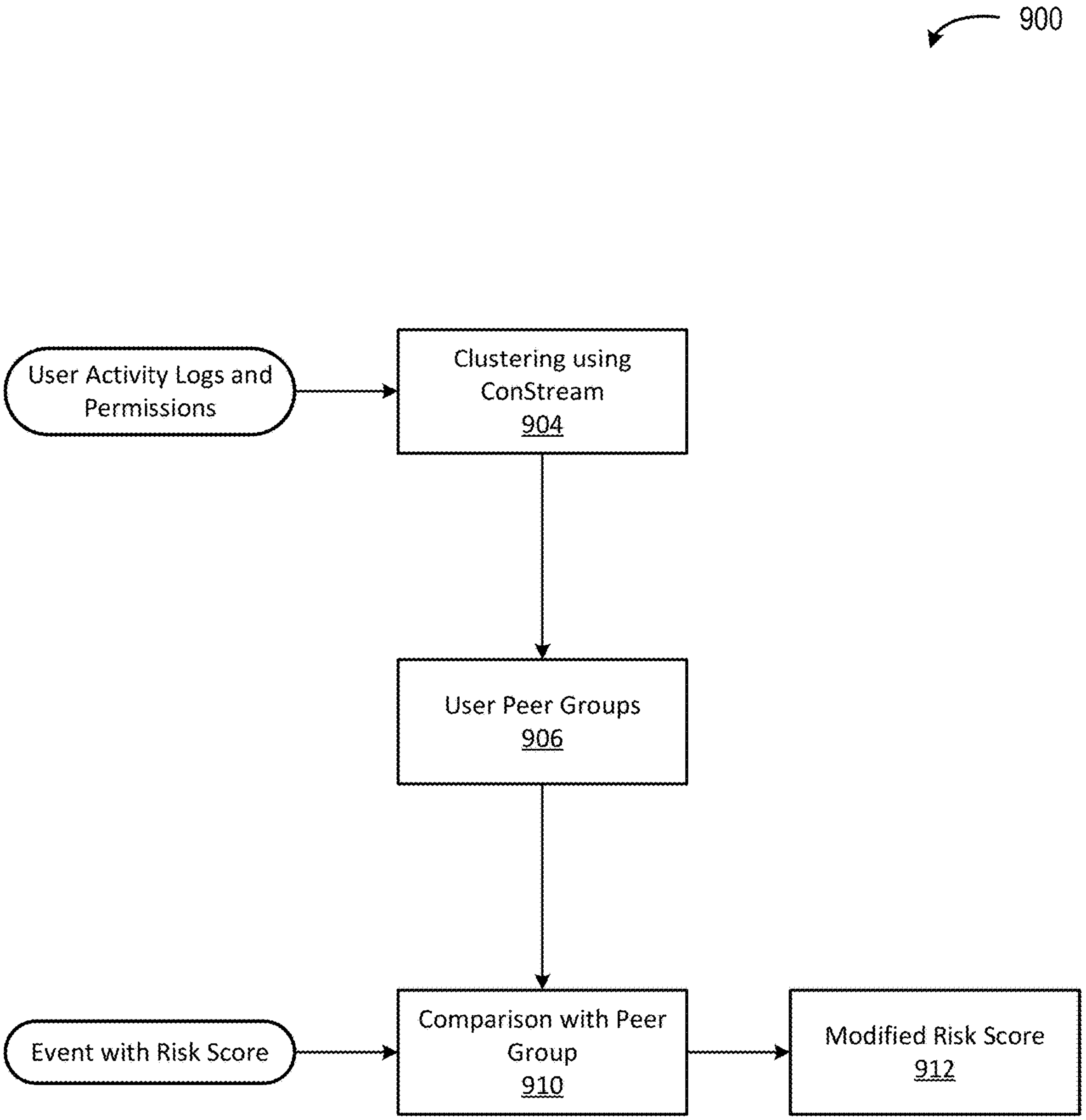
FIG. 9 is a flowchart of a method for determining a modified risk score using ConStream.

FIG. 9 is a flowchart 900 of a ConStream method for determining a modified risk score using Con Stream. The flowchart 900 starts at module 904 with clustering user activity logs and permissions using ConStream. Modules 906, 910, and 912 are the same as the modules 506, 510, and 512, which are described above with reference to FIG. 5.

All the algorithms discussed above update their models with the latest events irrespective of whether the events are anomalous. The reason behind this is that anomalous events generally span a short period of time, so even if the model is updated with these events, there would not be a significant change to the behavior of the model. The behavior of the model changes only if the events span across a longer duration. This is the case when the data distribution itself changes. Updating the model with these events would then ensure that the model recognizes the change and adapts to the new data distribution without any external intervention. This enables the system to function independently as soon as the initial configurations are made. The administrator also has an option of not updating the models with anomalous events if he so desires. While this is generally unnecessary and interferes with the automated running of the system, it can be done if the administrator wishes to have more control over the modelling.

Implementation Example (LOG360)

The techniques described above can be adapted to multiple (and most) domains. Implementation entails looking at actual input and how data is processed. Advantageously, the techniques are effective with relatively limited labeled data. For example, with data that is not labeled as normal or abnormal. When insufficient data is available for each user, it is difficult to label each transaction. While a domain may include a lot of data on users, it may lack sufficient data at an individual user level for labeling; in such a case, the techniques described above are powerful tools.

In this example, LOG360 builds risk profiles for anomalies for which risk scores are generated using techniques described above. Data that is used in this example includes user sign on logs, client server logs, firewall logs, printer logs, file access logs, and dBase access logs. Such data can be used to determine risk for multiple different scenarios. For example, more than typical number of file downloads may indicate a risk of an attempt to steal information while remote logon from a new device may indicate a risk of a network security breach. In this example, an admin can click on specific user to get profile and drill down to assess a threat.

Figure 10:
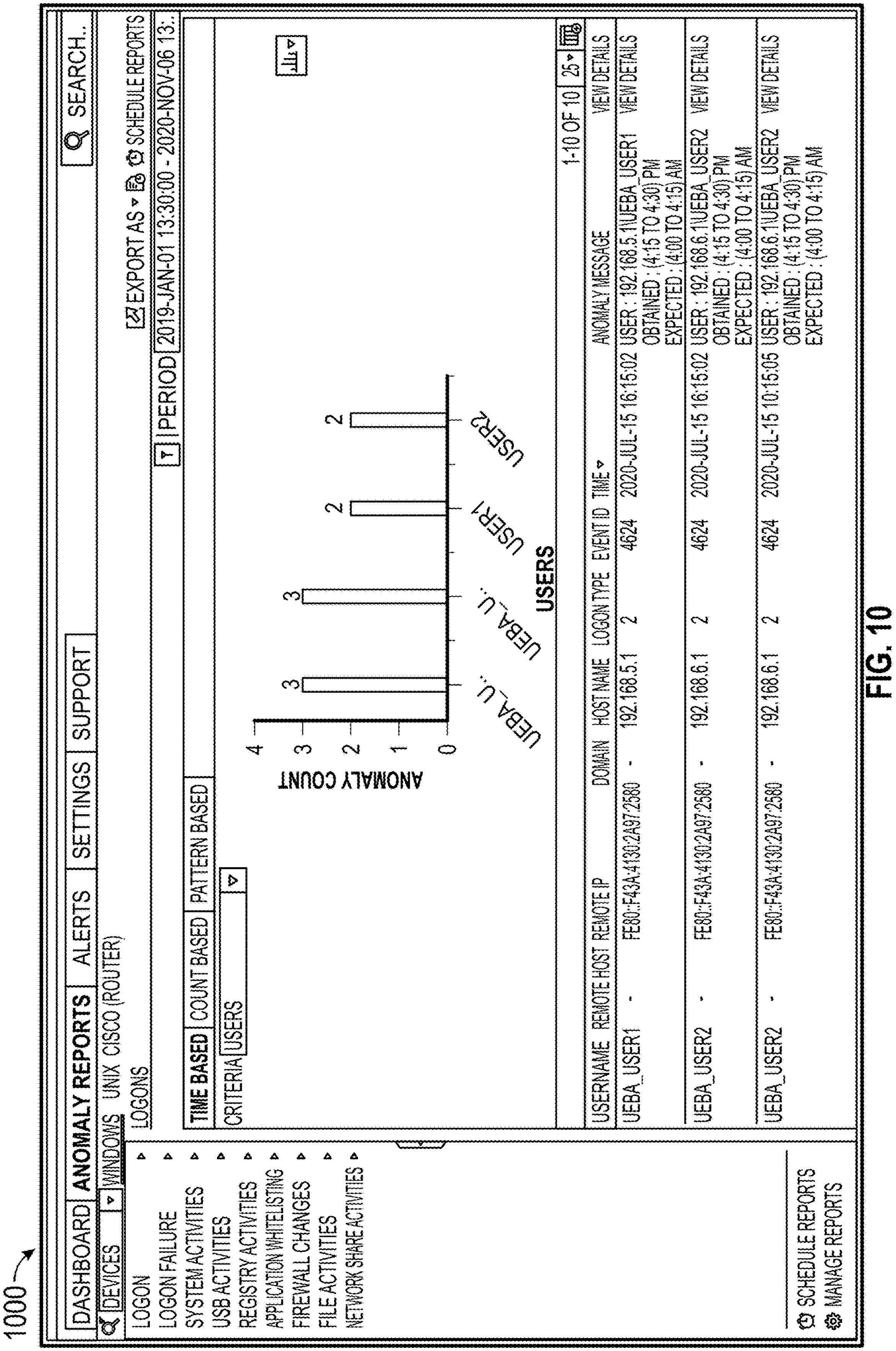
FIG. 10 is a screenshot of an example of a time-based anomalies report.

FIG. 10 is a screenshot 1000 of an example of a time-based anomalies report. In this example, a bar chart is used to show anomaly count for each of multiple users for a given timespan (or "period"), but any type of chart or table that conveys the relevant information to a human agent could be used. In this example, the anomaly count is for logons, but other device-related events, such as logon failure, system activities, USB activities, registry activities, application whitelisting, firewall changes, file activities, network share activities, or the like could also be selected in this implementation. The anomaly report can also be OS-specific (e.g., Windows, Unix, some other OS, router-specific, or the like). In this implementation, a drill-down is provided for each anomaly in a sortable list below the bar chart, but additional data may be made available with a mouseover or click (e.g., by clicking "view details").

Figure 11:
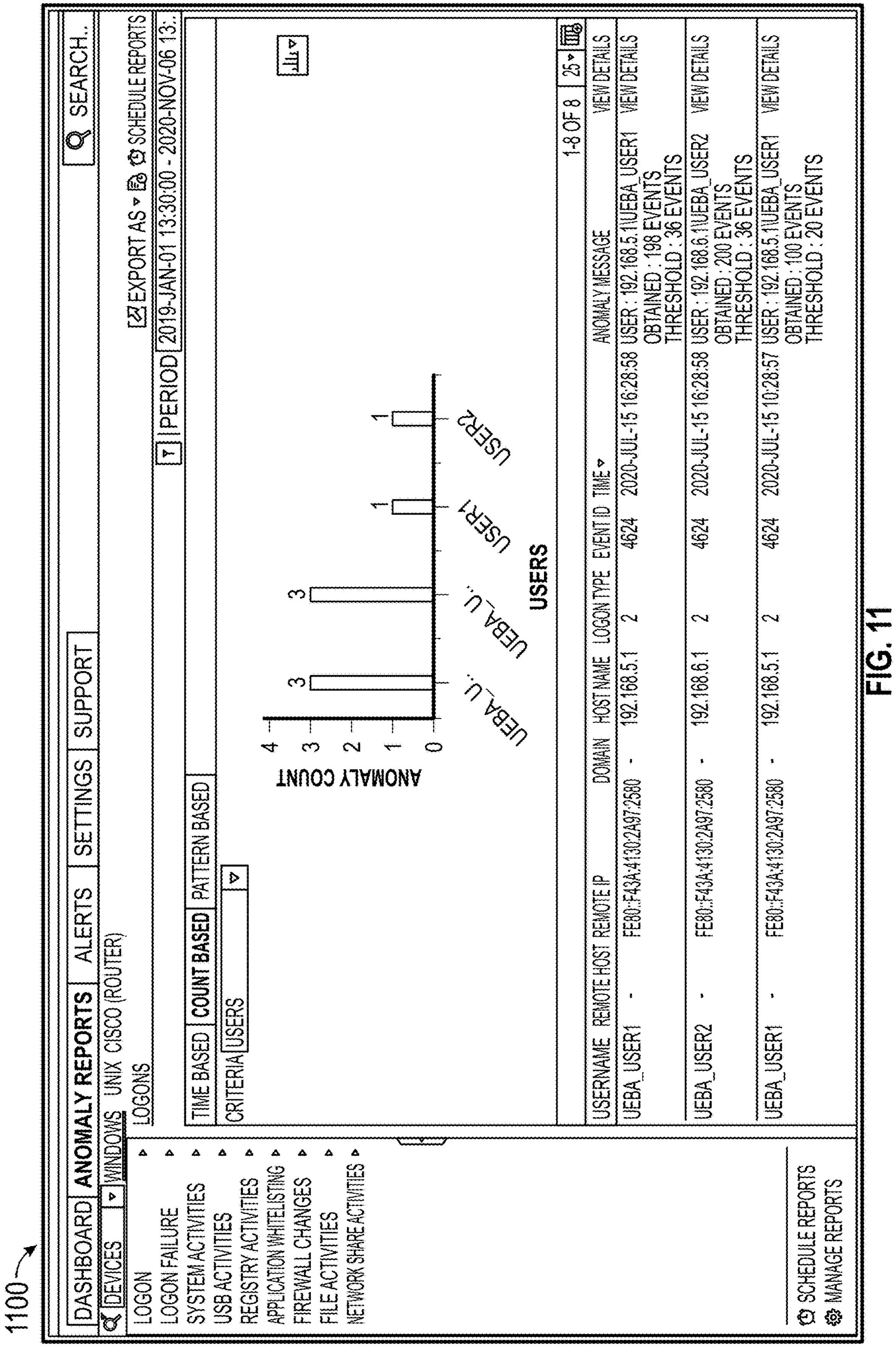
FIG. 11 is a screenshot of an example of a count-based anomalies report.

FIG. 11 is a screenshot 1100 of an example of a count-based anomalies report. This example is similar to that described above but the bar chart is for count-based anomalies instead of time-based anomalies.

Figure 12:
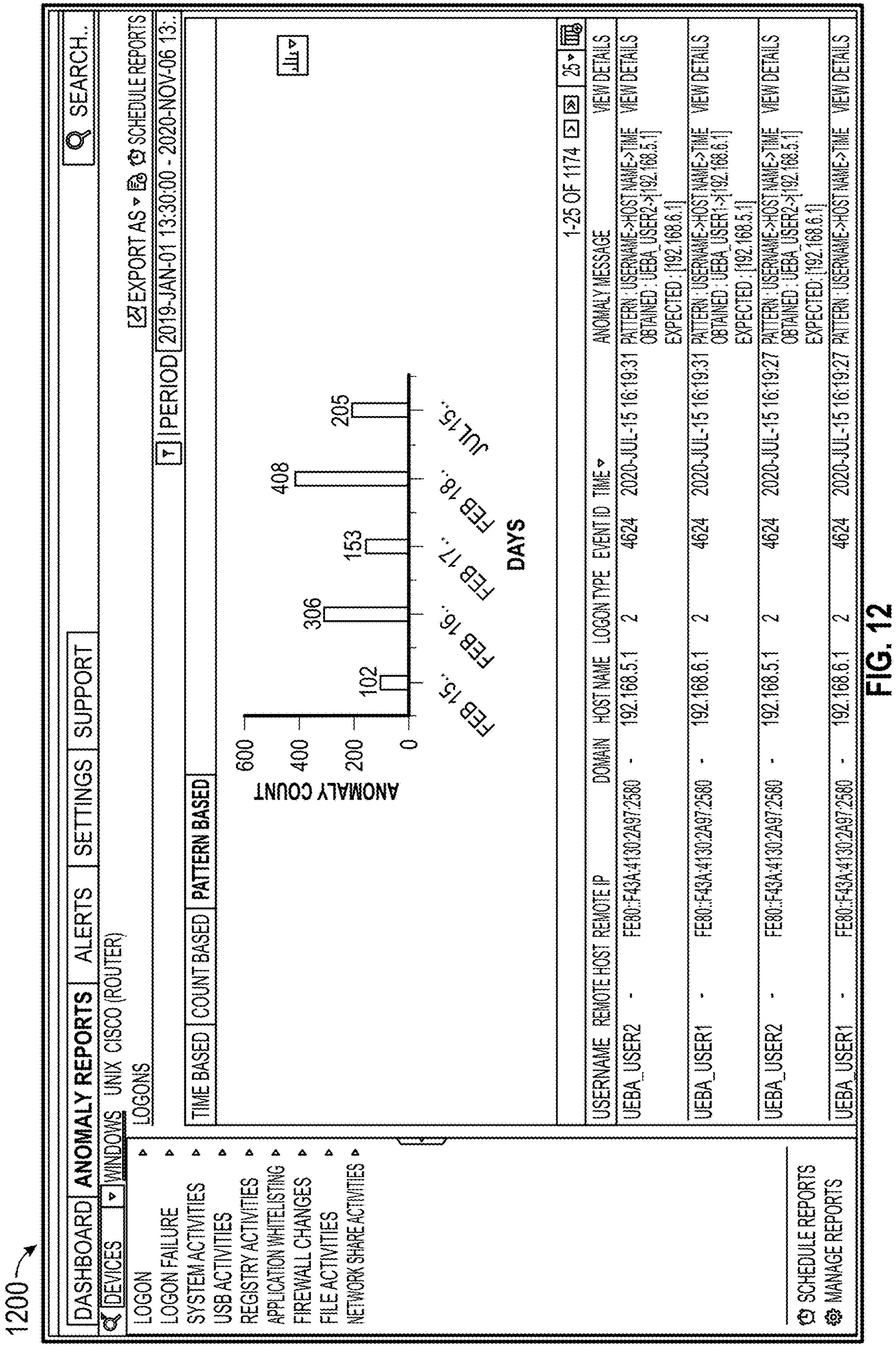
FIG. 12 is a screenshot of an example of a pattern-based anomalies report.

FIG. 12 is a screenshot 1200 of an example of a pattern-based anomalies report. This example is similar to that described above but the bar chart is for pattern-based anomalies instead of time-based anomalies.

Figure 13:
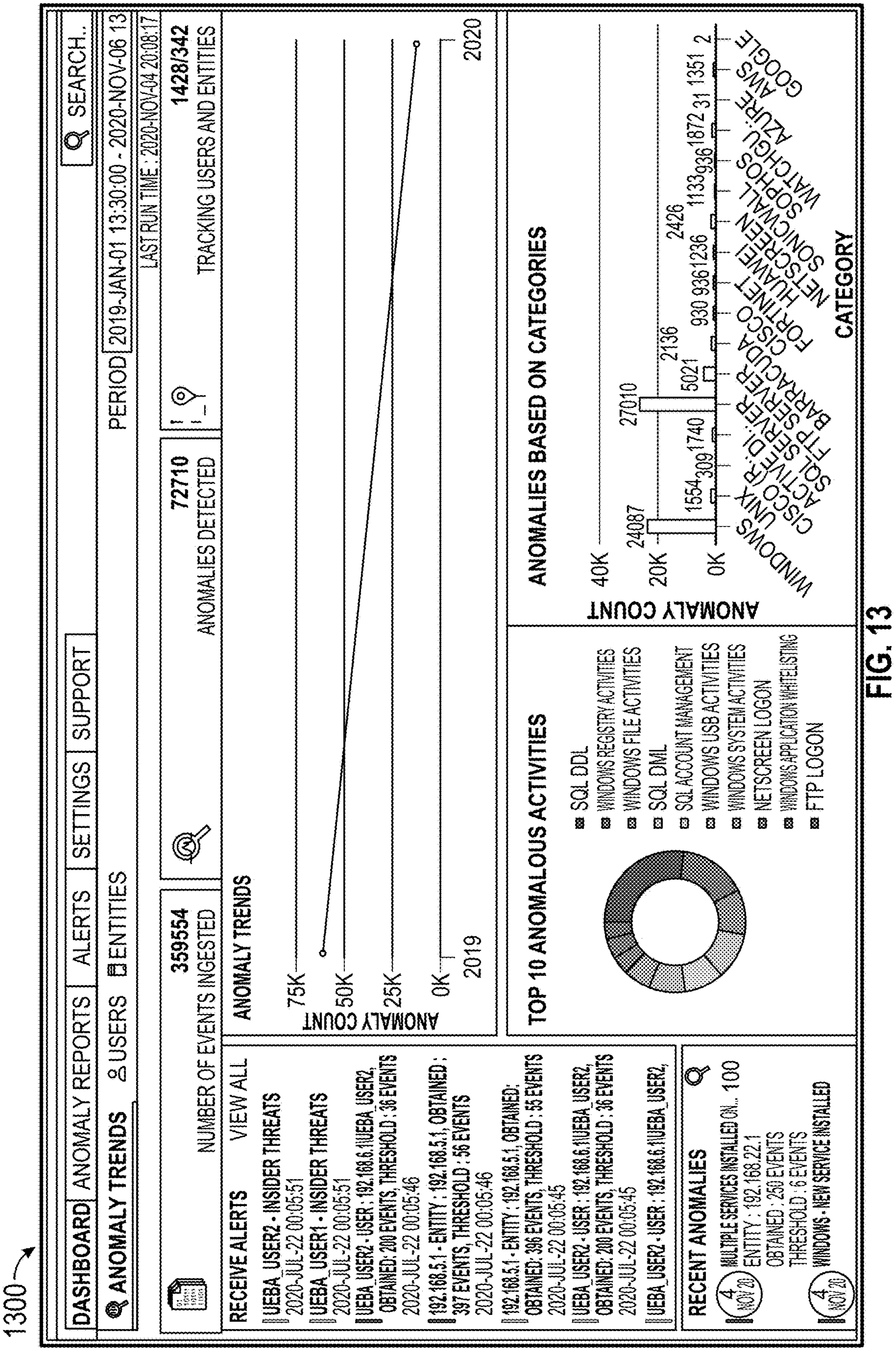
FIG. 13 is a screenshot of an example of a Log360 dashboard (scrolled up).

FIG. 13 is a screenshot 1300 of an example of a Log360 dashboard (scrolled up). The screenshot 1300 is intended to convey high level information to a human agent, such as number of events ingested, anomalies detected, number of users and entities tracked, recent alerts, recent anomalies, anomaly trends, top 10 anomalous activities, anomalies by category, and the like. In this example implementation, the dashboard is customizable (not shown).

Figure 14:
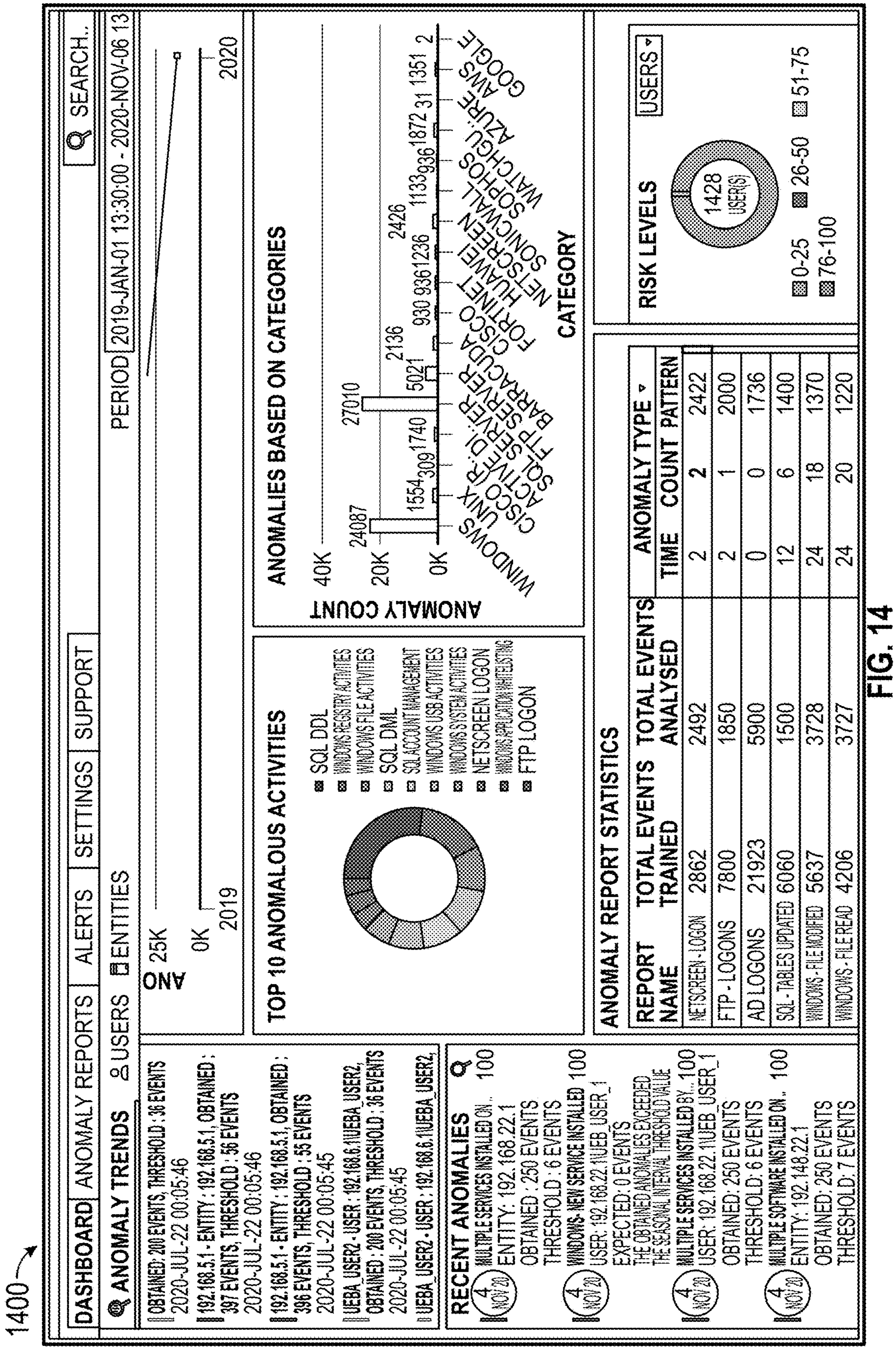
FIG. 14 is a screenshot of an example of a Log360 dashboard (scrolled down).

FIG. 14 is a screenshot 1400 of an example of a Log360 dashboard (scrolled down). The screenshot 1400 is the remainder of the window discussed above with reference to FIG. 13, when scrolled down all the way. The additional widgets include anomaly report statistics and a risk level graphic but as indicated above, the dashboard is customizable.

Figure 15:
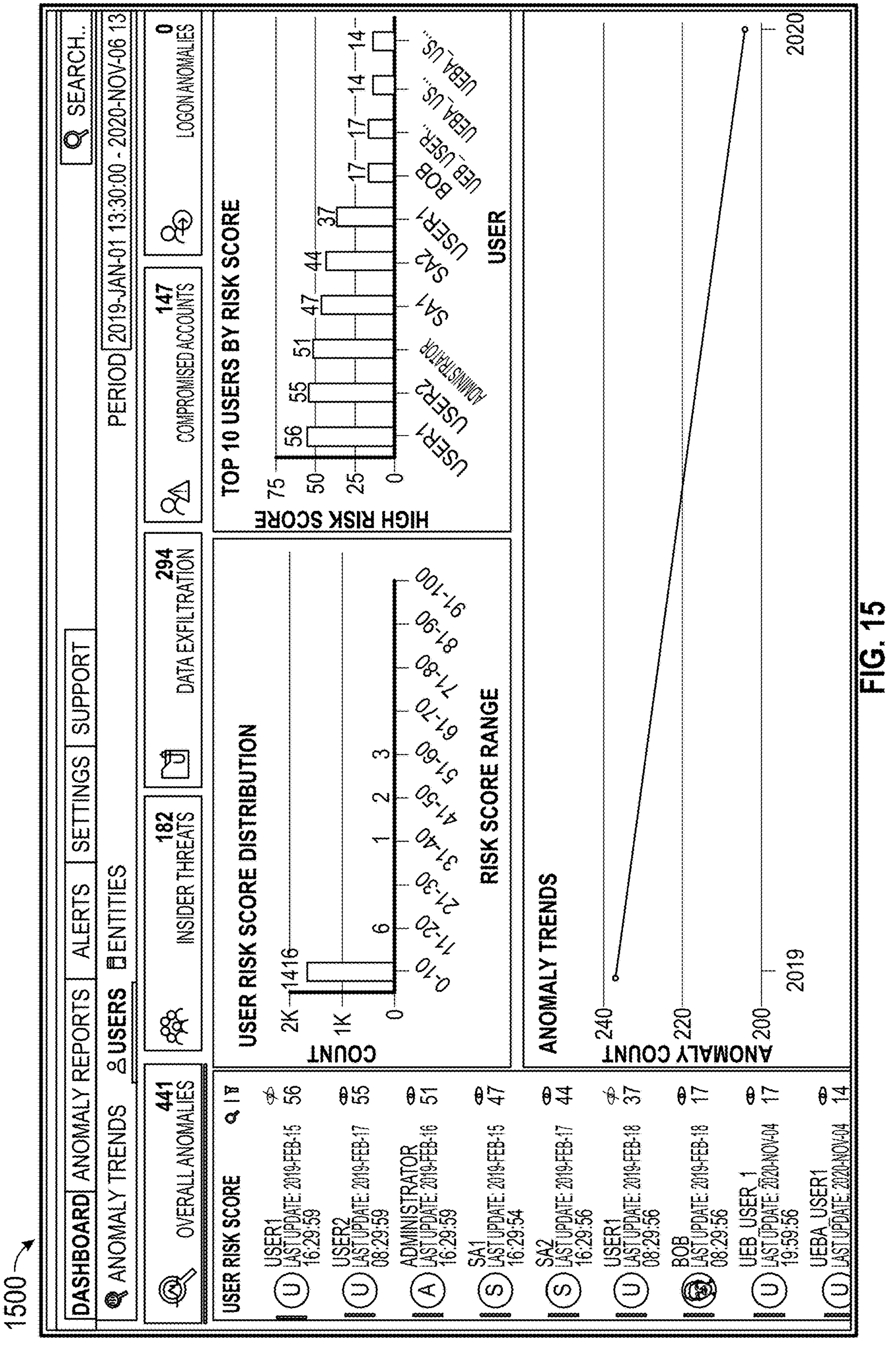
FIG. 15 is a screenshot of an example of a user risk distribution report.

FIG. 15 is a screenshot 1500 of an example of a user risk distribution report. In this example, the screenshot 1500 shows overall anomalies, insider threats, data exfiltration, compromised accounts, logon anomalies, user risk scores for multiple users, user risk score distribution, top 10 users by risk score, and anomaly trends.

Figure 16:
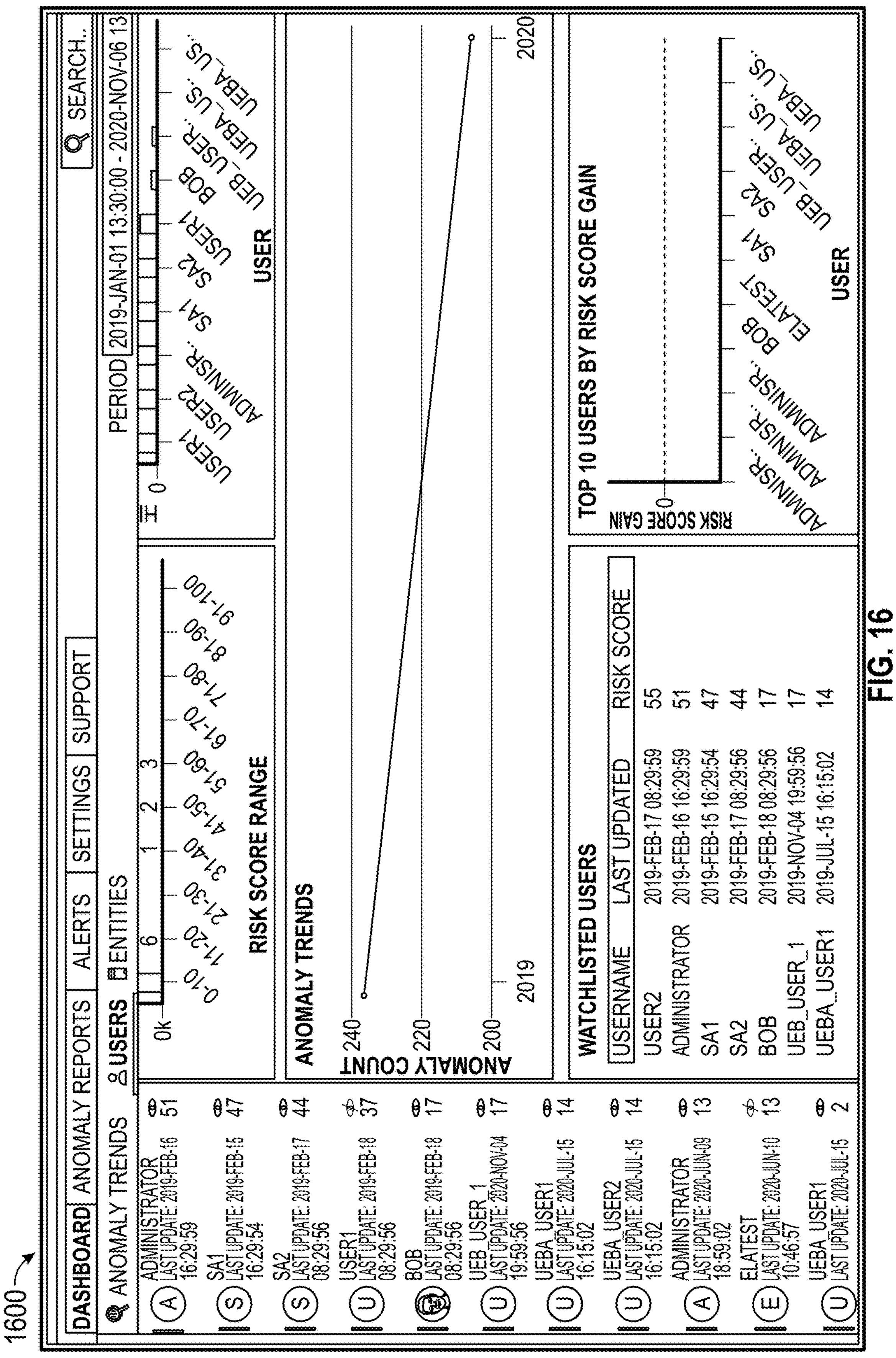
FIG. 16 is a screenshot of an example of a watchlisted users report.

FIG. 16 is a screenshot 1600 of an example of a watch-listed users report. Presented as a scroll-down relative to the screenshot 1500, the screenshot 1600 shows a watchlisted users list and top 10 users by risk score gain.

Figure 17:
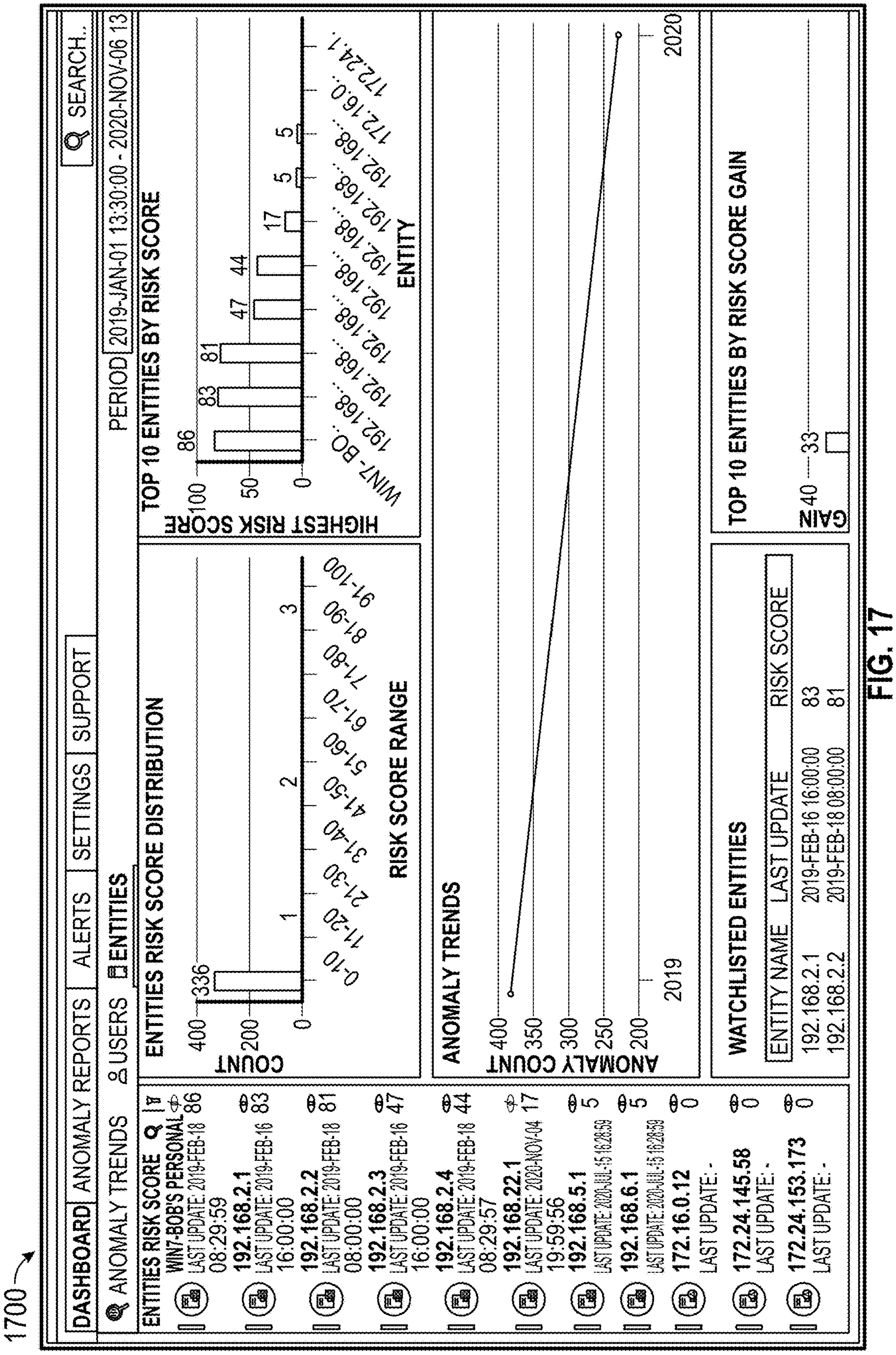
FIG. 17 is a screenshot of an example of an entity risk distribution report.

FIG. 17 is a screenshot 1700 of an example of an entity risk distribution report. The screenshot 1700 is similar to the screenshot 1500 (and 1600), but for entities.

Figure 18:
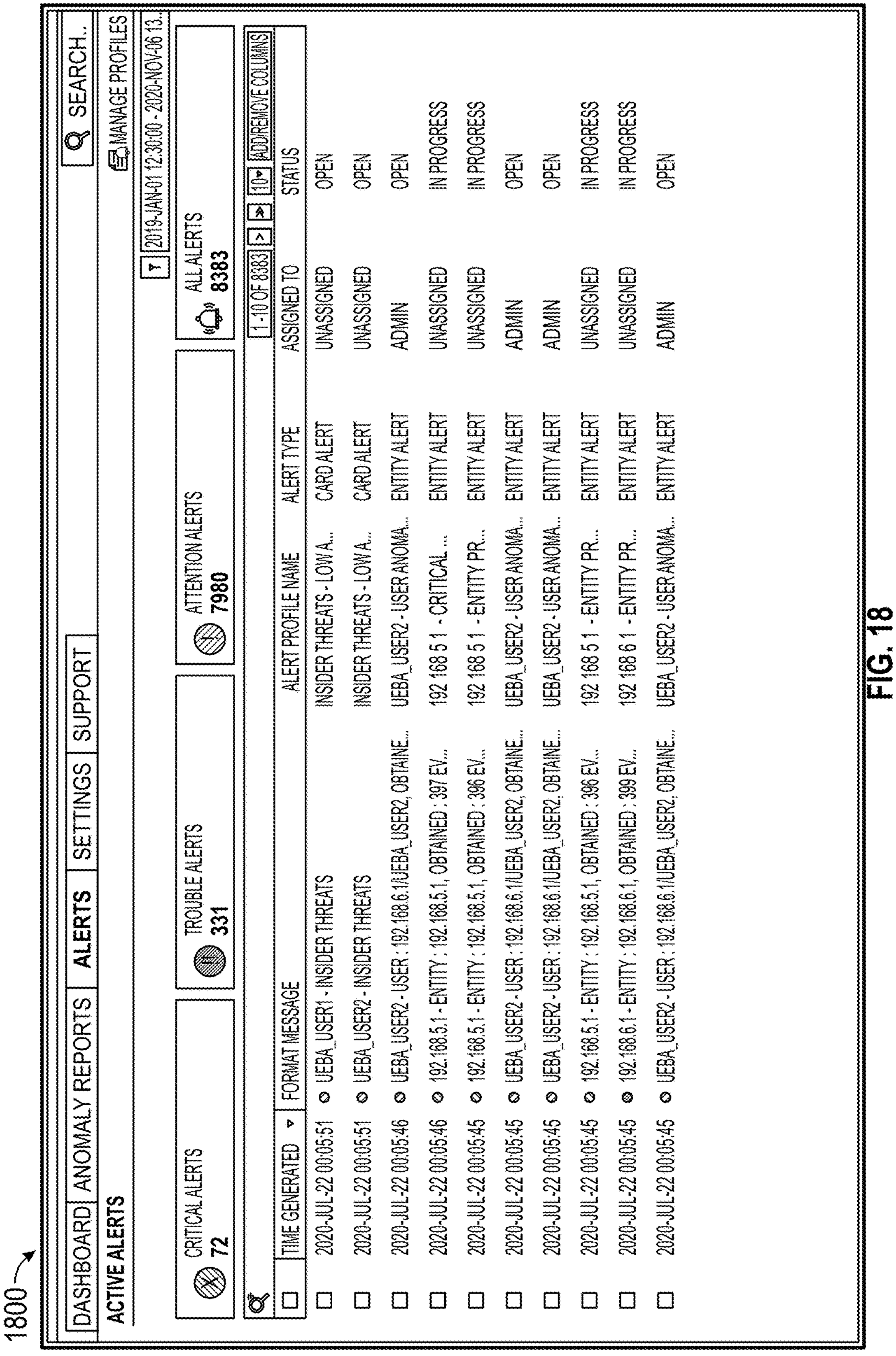
FIG. 18 is a screenshot of an example of an alerts report.

FIG. 18 is a screenshot 1800 of an example of an alerts report. The screenshot 1800 includes an indication of the number of critical alerts, trouble alerts, attention alerts, and all alerts, along with a list of alerts with an associated data drilldown (e.g., including status, assigned to, alert type, alert profile name, formal message, time generated, or the like). The response to alerts can be via a human (e.g., an explicit command to take an action or lack thereof) or artificial agent (e.g., a rules-based approach to alerts of a given severity or type, which may or may not be overridden by an explicit command).

Figure 19:
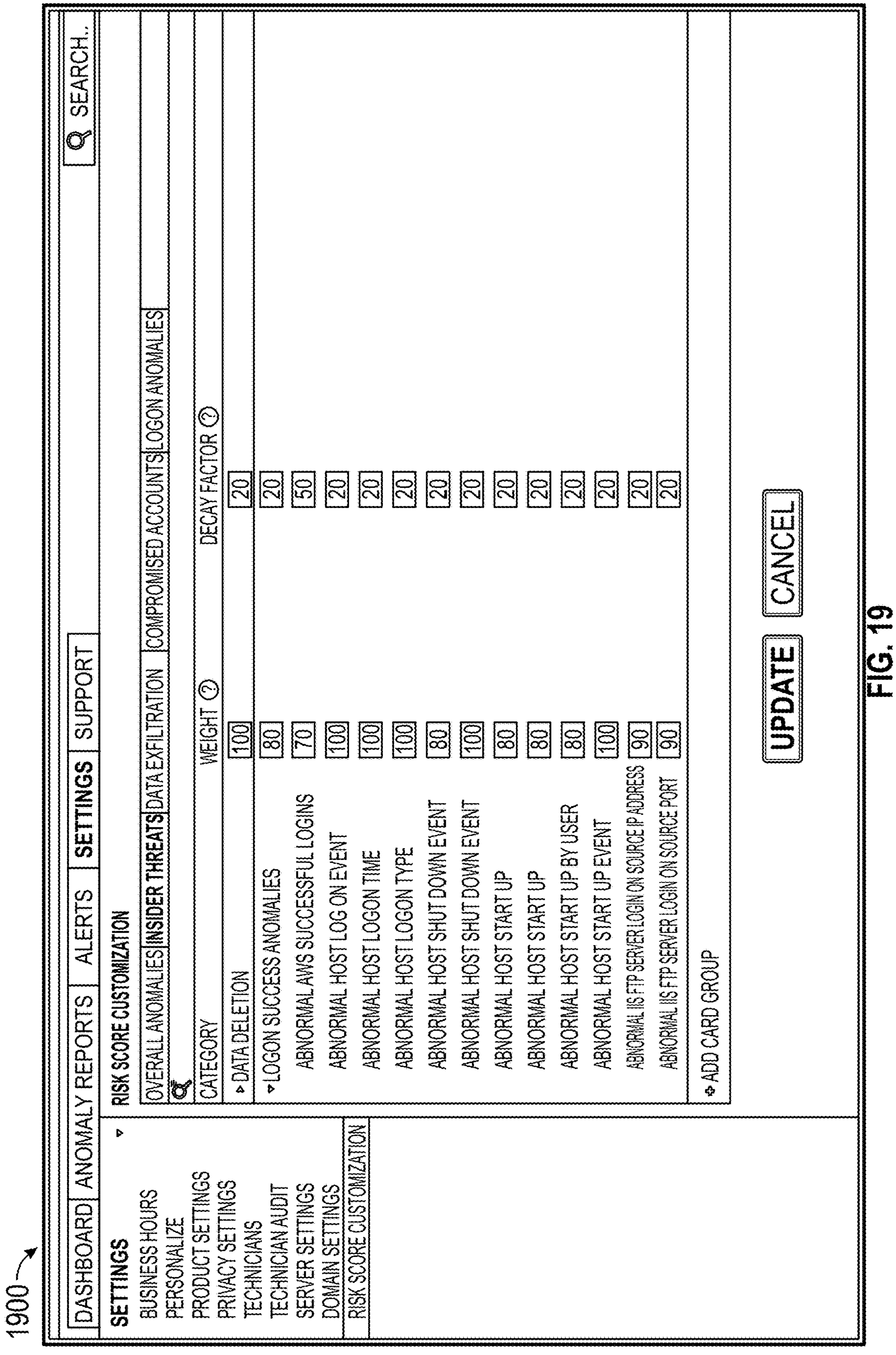
FIG. 19 is a screenshot of an example of a risk score customization report.

FIG. 19 is a screenshot 1900 of an example of a risk score customization report. The screenshot 1900 includes settings (e.g., business hours, personalize, product settings, privacy settings, technicians, technician audit, server settings, domain settings, and risk score customization, the last of which has been selected for illustrative purposes). Risk score customization allows customization for overall anomalies, insider threats, data exfiltration, compromised accounts, and logon anomalies; insider threats has been selected for illustrative purposes. Insider threat customization allows a human agent to provide a weight and decay factor for a number of event categories (e.g., data deletion, logon success anomalies, or the like). In this example, the categories can be given a weight and decay for the entire category (or as a default) and subcategories can be given a different weight and decay. For example, the category "logon success anomalies" has a weight of 80 and decay factor of 20 but the subcategory "abnormal AWS successful logins" has a weight of 70 and decay factor of 50 while "abnormal host logon event," "abnormal host logon time," "abnormal host logon type", and "abnormal host start up even" have weights of 100 and decay factors of 20.

An alternative implementation example is in a health care setting, such as a hospital. In hospitals you have doctors, patients, and others. It is useful to know about access to medication, diagnosis, treatment, etc., as well as who is accessing what. Detecting anomalous events, such as a change in medication or dosage, can be lifesaving in such an environment.

An alternative implementation example is in banking. You can flag behavior to, for example, identify fraudulent actors. Typically, a bank will not have enough training data to identify "normal" so instead, anomalies are detected. Logon to net banking, where, when, etc. It might be practically impossible to identify bad behavior in general, but anomalies are identifiable on an individual level and eventually turn into normal behavior for the individual. For example, an admin may configure a banking system to raise severe alerts when a logon attempt happens in a place known as a haven of hackers, but the admin may not know whether a logon that happens outside a blacklisted place is anomalous without considering individual user behavior. The UEBA system is useful in this scenario because it captures the behavior of each individual user. Thus, for example, a logon attempt by an individual user from a new place can trigger a severe warning, additional logon attempts by the individual user from the new place can trigger warnings of potentially decreasing severity (or increased severity, followed by decreasing severity), until the warnings ceased and the new place is no longer considered "new," becoming a new normal for the individual user.

Conceptualized System

Figure 20:
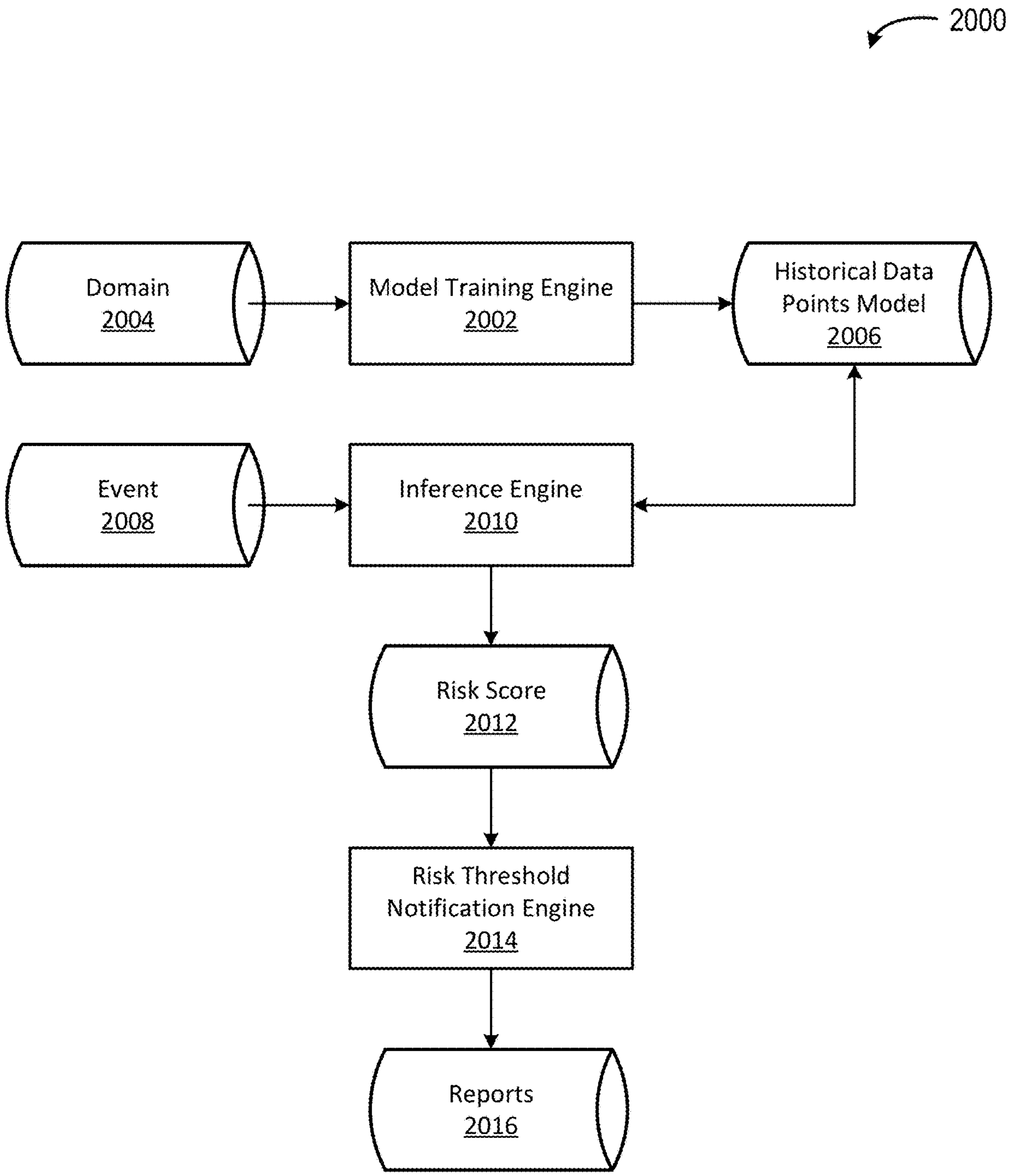
FIG. 20 is a diagram of a UEBA risk notification system with a historical data points model that evolves via inference.

FIG. 20 is a diagram 2000 of a UEBA risk notification system with a historical data points model that evolves via inference. The diagram 2000 includes a model training engine 2002, a domain datastore 2004 coupled to the model training engine 2002, a historical data points model datastore 2006 coupled to the model training engine 2002, an event datastore 2008, an inference engine 2010 coupled to the historical data points model 2006 and the event datastore 2008, a risk score datastore 2012 coupled to the inference engine 2010, a risk threshold notification engine 2014 coupled to the risk score datastore 2012, and a reports datastore 2016 coupled to the risk threshold notification engine 2014.

The CRM 402 and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The CRM 402 and other computer readable mediums discussed in this paper are intended to represent a variety of potentially applicable technologies. For example, the CRM 402 can be used to form a network or part of a network. Where two components are co-located on a device, the CRM 402 can include a bus or other data conduit or plane. Where a first component is co-located on one device and a second component is located on a different device, the CRM 402 can include a wireless or wired back-end network or LAN. The CRM 402 can also encompass a relevant portion of a WAN or other network, if applicable.

The devices, systems, and computer-readable mediums described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g., "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

Returning to the example of FIG. 20, the model training engine 2002 is intended to represent an engine that performs training for one or more of a time-based model, a count-based model, and a pattern-based model. In a specific implementation, the model training engine 2002 includes an RICA engine, a Markov chain engine, and an EMA engine that respectively perform training for a time-based model, a count-based model, and a pattern-based model. The model training engine 2002 can perform a training phase as described above with reference to FIGS. 2, 3, and 4.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor that is a component of the engine. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

Returning to the example of FIG. 20, the domain datastore 2004 is intended to represent a datastore of model training data. In a specific implementation, model training data includes historical data suitable for input for RPCA and for the purpose of maintaining EMA, or data suitable for training a Markov chain. The historical data points model datastore 2006 is intended to represent a model as described previously in this paper.

A database management system (DBMS) can be used to manage a datastore. In such a case, the DBMS may be thought of as part of the datastore, as part of a server, and/or as a separate system. A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the repositories described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. An optimal structure may vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Returning to the example of FIG. 20, the inference engine 2010 is intended to represent an engine that consults the historical data points model datastore 2006 regarding an event in the event datastore 2008 to generate a risk score for the risk score datastore 2012. Advantageously, the inference engine 2010 also updates the historical data points model datastore 2006 by inference, which is intended to mean the inference engine 2010 replaces the model training engine 2002 as the mechanism by which the historical data points model datastore 2006 is updated.

The risk threshold notification engine 2014 provides the risk score in the risk score datastore 2012 in a report in the reports datastore 2016. It may be noted a risk score of 0 can be referred to as having no risk, which would always fail to reach the risk threshold for notification purposes. However, it is also possible to set the risk threshold to a value above 0, if desired. Reports need not be complete reports. For example, the reports datastore 2016 can include data sufficient to populate charts and tables as illustrated in the screenshots of FIGS. 10-19.

Figure 21:
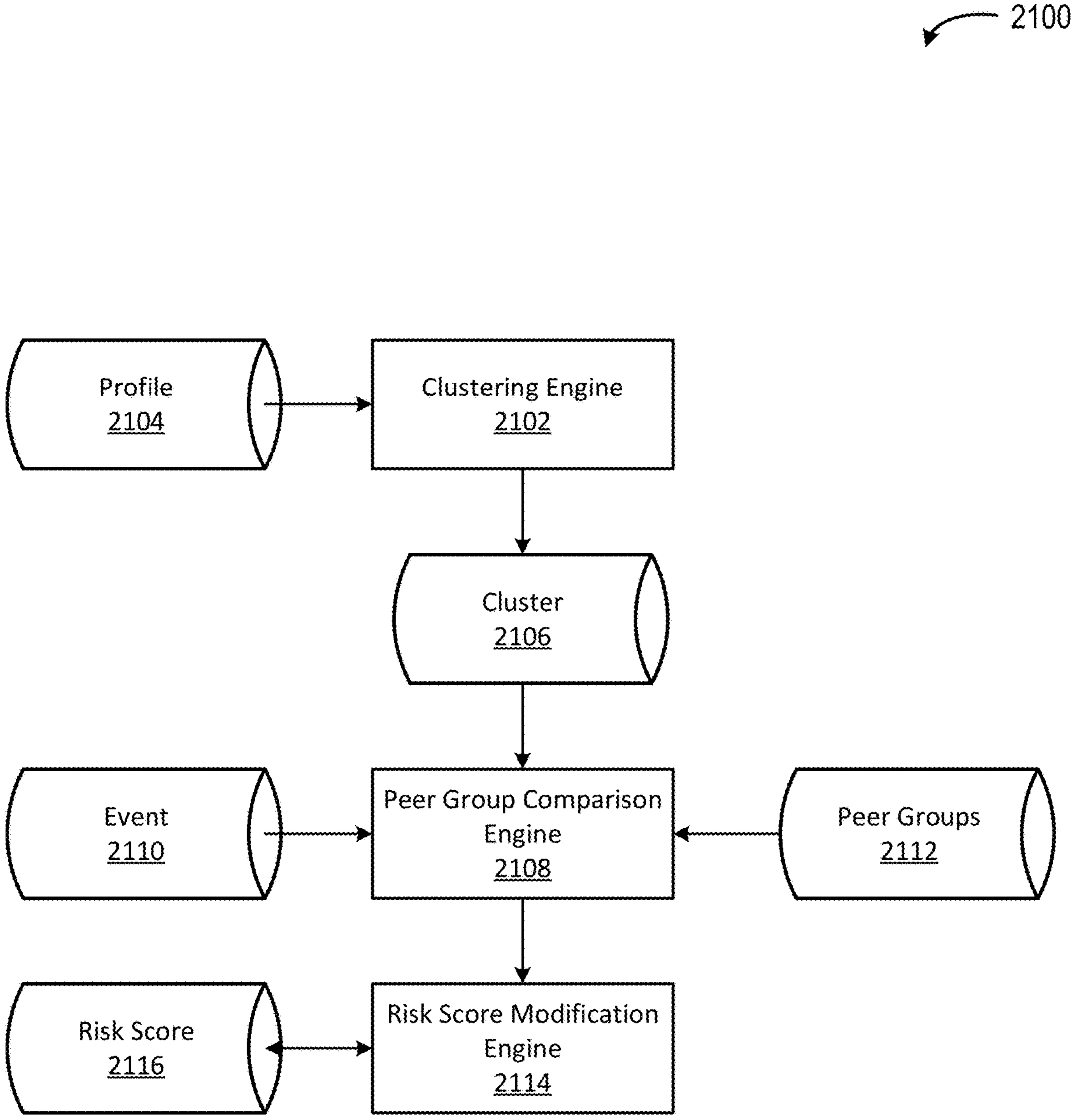
FIG. 21 is a diagram of a UEBA risk score modification system using clustering.

FIG. 21 is a diagram 2100 of a UEBA risk score modification system using clustering. The diagram 2100 includes a clustering engine 2102, a profile datastore 2104 coupled to the clustering engine 2102, a peer groups datastore 2112 coupled to the clustering engine 2102, a peer group comparison engine 2108 coupled to the peer groups datastore, an event datastore 2110 coupled to the peer group comparison engine 2108, a risk score modification engine 2114 coupled to the peer group comparison engine 2108, and a risk score datastore 2116 coupled to the risk score modification engine 2114.

The clustering engine 2102 is intended to represent an engine that clusters data associated with a user or entity in the profile datastore 2104 for the peer groups datastore 2112. Clustering can be accomplished as described previously with reference to the examples of FIGS. 7 and 8. In a specific implementation, the cluster datastore 2106 can be characterized as a tree structure as described previously with reference to the example of FIG. 6.

The peer group comparison engine 2108 is intended to represent an engine that upon receiving an event represented in the event datastore 2110, matches it to the corresponding peer group of the peer groups datastore 2112, and, provides an indication to the risk score modification engine 2114 to modify a current risk score associated with the event and the user or entity. Advantageously, if a user or entity can be matched to a peer group that has certain behaviors, events that are perhaps anomalous to a user or entity can be seen as non-anomalous for a peer group, which could be motivation to reduce the associated risk score. For example, an engineer may not make use of a useful website, but upon learning about the resource begins to use it, navigates to the website for the first time; if other engineers of the same peer group use the website, the risk score associated with the new behavior can (perhaps) be reduced. Advantageously, this risk score analysis can be complemented by a rules-based network security protocol, allowing the use of both network security rules and risk scores. For example, a system can include risk scores associated with remote logon in addition to rules associated with remote logon that may supersede, act as a minimum or maximum, or act as a default for risk scoring.

The invention claimed is:

1. A system for user and entity behavior analysis, the system comprising:

a model datastore that stores unsupervised machine learning models that can detect time, pattern and count anomalies;

a model training engine coupled to the model datastore and configured to train the unsupervised machine learning models, using past events with respect to a specific user or entity, wherein the unsupervised machine learning models, after training, have knowledge regarding a data distribution of the past events;

an inference engine coupled to the model datastore;

a clustering engine coupled to the inference engine;

a risk score modification engine coupled to the clustering engine;

wherein, in operation, the inference engine:

passes an incoming event to a subset of models present in the model datastore to obtain a risk score that is a representation of how anomalous the incoming event is, and passes an expected value associated with an expected event that follows the data distribution of the past events, wherein the subset of models are automatically updated after inference;

automatically updates, with the incoming event after inference, data distributions of the subset of models to which the incoming event was passed;

adapts to concept drift, wherein the concept drift is associated with changes in user or entity behavior;

wherein, in operation, the clustering engine clusters non-streaming data, using agglomerative hierarchical clustering comprising a ROCK algorithm that calculates Jaccard similarity, and outputs cluster representations used as baseline behavior for peer groups, together two or more users or entities based on common behavior as a peer group, and wherein, in operation, the peer group changes over time if the user or entity behavior changes according to the concept drift;

wherein, in operation, the clustering engine switches, when data is received as a stream, to clustering using a streaming clustering algorithm that adapts to the concept drift, wherein the streaming clustering algorithm comprises a ConStream method that uses a weighted Jaccard coefficient with a fading function, and clusters user or entity data, for comparison to the peer group, based on common attributes and behaviors;

wherein, in operation, when the incoming event is anomalous, the risk score modification engine modifies a risk score of the incoming event associated with a user or entity by comparison with the peer group to which the user or entity belongs.

2. The system of claim 1, wherein:

the model training engine includes a subengine selected from a group consisting of a Robust Principal Component Analysis (RPCA) engine, a Markov chain engine, an Exponential Moving Average (EMA) engine, and multiple ones of these;

wherein, in operation, the RPCA engine encodes timestamps of incoming events and detects time anomalies;

wherein, in operation, the Markov chain engine detects pattern anomalies;

wherein, in operation, the EMA engine detects count anomalies;

wherein the subengine is unsupervised.

3. The system of claim 1, wherein an anomaly is associated with the risk score, the risk score is a function of an expected value associated with the incoming event and an actual value associated with the incoming event, and a level of the risk score is proportionate to a severity of the anomaly.

4. The system of claim 1, wherein the risk score of an incoming event that is flagged as a time anomaly depends on a difference between a time the incoming event was expected to occur and a time the incoming event actually occurred.

5. The system of claim 1, wherein the risk score of an incoming event that is flagged as a count anomaly depends on a difference between a threshold value and a total count of the incoming event, aggregated over an interval, and wherein the threshold value is based on past counts of the incoming event over specific intervals.

6. The system of claim 1, wherein when the risk score is greater than or equal to a threshold, the incoming event is flagged as a pattern anomaly, and the threshold is based on past patterns that have occurred.

7. The system of claim 1, comprising a peer group comparison engine that compares the incoming event to the peer group to determine whether the incoming event is anomalous relative to the peer group.

8. The system of claim 7, wherein the risk score modification engine increases the risk score if the incoming event is anomalous to the peer group.

9. The system of claim 1, wherein the inference engine is configured to track first behavior of the user or entity of the two or more users or entities, flag second behavior that is different from the first behavior as anomalous, and assign the risk score to the second behavior, wherein expected behavior is one of an expected time of occurrence of the incoming event in the case of time anomalies, an expected count of events aggregated over a particular interval in the case of count anomalies, and expected values of attributes of the incoming event in the case of pattern anomalies.

10. The system of claim 1, wherein the inference engine is configured to detect the time, count, and pattern anomalies, and uses the detected time, count and pattern anomalies, which are generic in nature and thereby facilitate deployment in multiple domains, to identify instances of data exfiltration, insider threats, or compromised accounts.

11. A method for user and entity behavior analysis, the method comprising:

training, by a system, multiple unsupervised machine learning models;

storing the models in a model datastore;

passing during inference, by the system, an incoming event to a subset of models in the model datastore to obtain a risk score that is a representation of how anomalous the incoming event is and passing an expected value associated with an expected event that follows data distribution of past events;

automatically updating, by the system, the models in the model datastore and data distributions of the subset of models to which the incoming event was passed after inference;

adapting to concept drift, wherein the concept drift is associated with changes in user or entity behavior;

clustering non-streaming data, using agglomerative hierarchical clustering comprising a ROCK algorithm that calculates Jaccard similarity, and outputs cluster representations used as baseline behavior for peer groups, together two or more users or entities based on common behavior to form a peer group, wherein the peer group changes over time if the user or entity behavior changes according to the concept drift;

switching, when data is received as a stream, to clustering using a streaming clustering algorithm that adapts to the concept drift, wherein the streaming clustering algorithm comprises a ConStream method that uses a weighted Jaccard coefficient with a fading function, and clustering user or entity data, for comparison to the peer group, based on common attributes and behaviors;

when the incoming event is anomalous, modifying a risk score of the incoming event associated with a user or entity of the two or more users or entities by comparison with the peer group to which the user or entity belongs.

12. The method of claim 11, comprising using a subengine selected from a group consisting of a Robust Principal Component Analysis (RPCA) model, a Markov chain model, an Exponential Moving Average (EMA) model, and multiple ones of these, wherein the subengine is unsupervised and adapts concept drift.

13. The method of claim 11, comprising clustering user or entity data for comparison to the peer group.

14. The method of claim 11, comprising comparing the incoming event to the peer group to determine whether the event is anomalous relative to the peer group.

15. The method of claim 11, comprising decreasing the risk score associated with the incoming event and the user or entity when the user or entity is in a peer group for which the incoming event is not anomalous.

16. The method of claim 11, comprising:

tracking first behavior of the user or entity;

flagging second behavior that is different from the first behavior as anomalous; and assigning the risk score to the second behavior.

17. The method of claim 11, comprising:

detecting time, count, and pattern anomalies; and using the detected time, count, and pattern anomalies, which are generic in nature and thereby facilitate deployment in multiple domains, to identify instances of data exfiltration, insider threats, or compromised accounts.

* * * * *